US012192695B1

(12) United States Patent
Stockton X et al.

(10) Patent No.: US 12,192,695 B1
(45) Date of Patent: Jan. 7, 2025

(54) OPEN HEADPHONES WITH ACTIVE NOISE CANCELLATION

(71) Applicant: Amazon Technologies, Inc., Seattle, WA (US)

(72) Inventors: Andrew Jackson Stockton X, Seattle, WA (US); Mihir Dhananjay Shetye, Seattle, WA (US); Wontak Kim, Seattle, WA (US); Zhen Sun, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 355 days.

(21) Appl. No.: 17/708,607

(22) Filed: Mar. 30, 2022

(51) Int. Cl.
*H04R 1/10* (2006.01)
*G10K 11/178* (2006.01)

(52) U.S. Cl.
CPC ..... *H04R 1/1075* (2013.01); *G10K 11/17823* (2018.01); *G10K 11/17881* (2018.01); *H04R 1/1008* (2013.01); *H04R 1/1041* (2013.01)

(58) Field of Classification Search
CPC .. H04R 1/1075; H04R 1/1008; H04R 1/1041; G10K 11/17823; G10K 11/17881
See application file for complete search history.

(56) References Cited

U.S. PATENT DOCUMENTS 4,418,248 A 11/1983 Mathis
5,357,585 A 10/1994 Kumar
10,080,088 B1 9/2018 Yang
11,937,042 B2 * 3/2024 Saule .................. H04R 1/1025
2003/0202668 A1 * 10/2003 Kao .................... H04R 1/1016 381/74
2012/0207320 A1 * 8/2012 Avital ................. H04R 1/1041 381/74
2014/0169579 A1 * 6/2014 Azmi .................. H04R 1/1083 381/71.6
2023/0254630 A1 8/2023 Sato
2023/0292032 A1 9/2023 Boothe

OTHER PUBLICATIONS

Office Action issued Dec. 21, 2023 for U.S. Appl. No. 17/708,678.

* cited by examiner

*Primary Examiner* — Sunita Joshi
(74) *Attorney, Agent, or Firm* — Pierce Atwood LLP

(57) ABSTRACT

A wearable audio output device (e.g., headphones) having an open design that allows ambient noise to pass to a listener without physically isolating the listener from a surrounding environment. The device may include an open earcup design that may partially or completely surround the listener's ear, and in some examples a portion of the listener's head may be uncovered by the open earcup. To improve comfort, the device includes a floating audio component configured to generate output audio in a direction of the listener's ear without contacting the listener's ear. To reduce an amount of ambient noise, the device may be configured to perform active noise cancellation (ANC) processing using feedforward and/or feedback microphones. The device may include an acoustic structure configured to direct the output audio in the direction of the listener's ear and/or position the feedback microphone(s) closer to the listener's ear.

17 Claims, 18 Drawing Sheets

P77389-US01

Dual-Transducer Examples 1300

OPEN HEADPHONES WITH ACTIVE NOISE CANCELLATION

BACKGROUND

With the advancement of technology, the use and popularity of electronic devices has increased considerably. Electronic devices may be connected to headphones that generate output audio. Disclosed herein are technical solutions to improve output audio generated by headphones while reducing sound leakage.

BRIEF DESCRIPTION OF DRAWINGS

For a more complete understanding of the present disclosure, reference is now made to the following description taken in conjunction with the accompanying drawings.

DETAILED DESCRIPTION

Figure 1A:
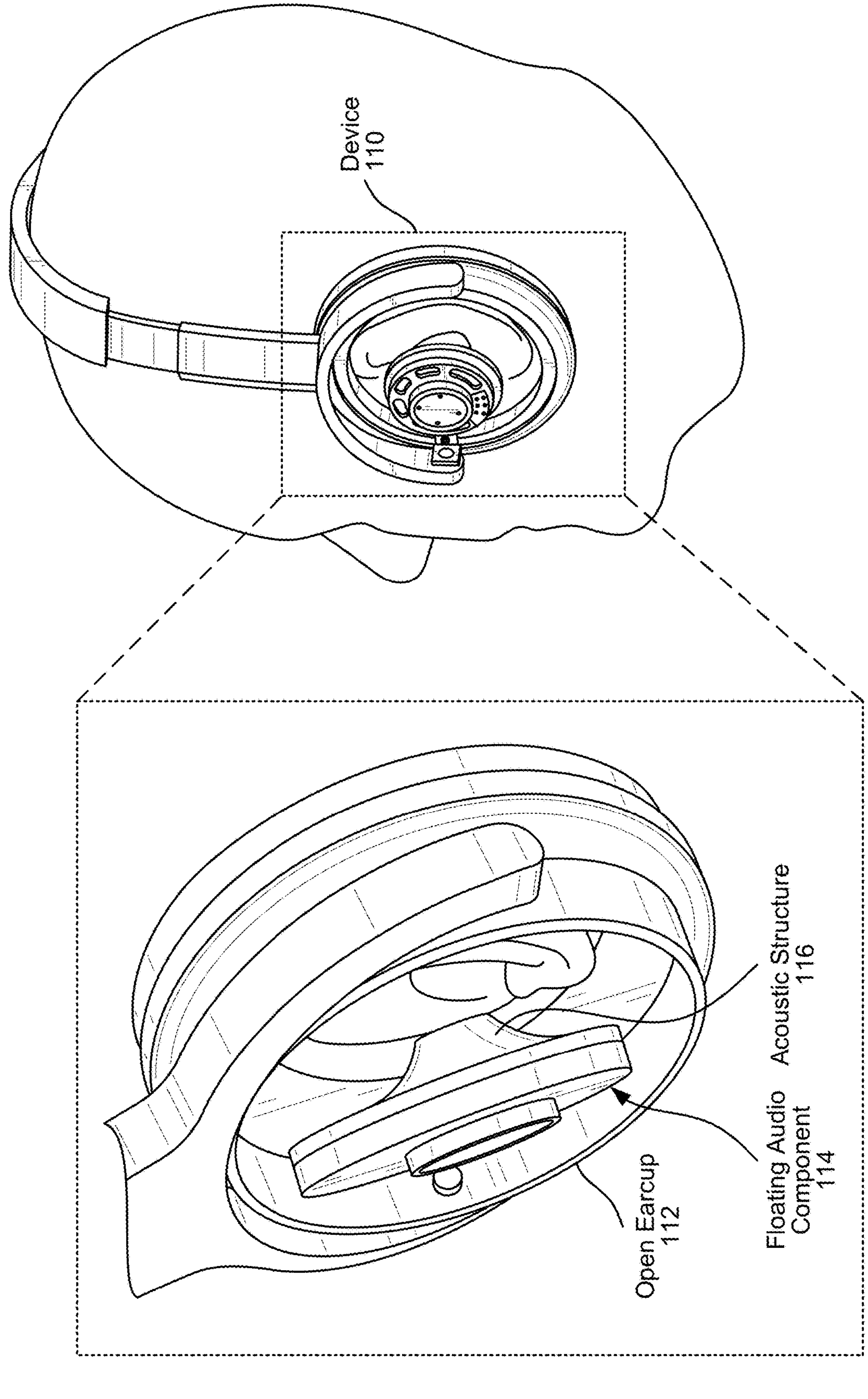
FIG. 1A illustrates a wearable audio output device according to embodiments of the present disclosure.

Some electronic devices may include an audio-based input/output interface. A user may interact with such a device—which may be, for example, a smartphone, tablet, computer, or other speech-controlled device—partially or exclusively using his or her voice and ears. Exemplary interactions include listening to music or other audio, communications such as telephone calls, audio messaging, and video messaging, and/or audio input for search queries, weather forecast requests, navigation requests, or other such interactions.

For a variety of reasons, a user may prefer to connect headphones to the device to generate output audio. Headphones may also be used by a user to interact with a variety of other devices. As the term is used herein, "headphones" may refer to any wearable audio input/output device and includes headsets, earphones, earbuds, or any similar device. For added convenience, the user may choose to use wireless headphones, which communicate with the device—and optionally each other—via a wireless connection, such as Bluetooth, Wi-Fi, near-field magnetic induction (NFMI), Long Term Evolution (LTE), 5G, or any other type of wireless connection.

In certain configurations headphones may deliberately isolate a user's ear (or ears) from an external environment. Such isolation may include, but is not limited to, providing earcups that envelope a user's ear, blocking the ear off from the external environment. Such isolation may also include earbuds which sit at least partially within a user's ear canal, potentially creating a seal between the earbud device and the user's ear which effectively block the inner portions of the ear canal from the external environment. Such isolation results in a significant physical separation from the ear to one or more external noise sources and may provide certain benefits, such as improving an ability to shield the user from external noises and effectively improve the quality of the audio being output by the headphone, earbud, or the like. Such isolation may assist in improving the performance of acoustic noise cancellation (ANC) or other cancellation/noise reduction technology, whose purpose is to reduce the amount of external noise that is detectable by a user. That is, the significant physical separation provided by the headphone/earbud (which may result, for example, from the seal between an earcup and an ear, the seal between an earbud and an ear canal, etc.) may provide additional benefits to cancellation technology. Although headphones can create isolated listening conditions, headphones that have such physical separation isolate the listeners from the surrounding environment, hinder communications between multiple listeners and result in uncomfortable listening experience due to fatigue and/or discomfort. Specifically, certain headphones, earbuds, etc. that create a seal separating a portion of the ear from the external environment may be uncomfortable for certain users due to an undesired pressure on the ear during noise cancellation, physical discomfort of the device when contacting the ear/head, or the like.

To improve comfort of a listener and enable individual listening conditions without isolating the listener from the surrounding environment, devices, systems and methods are disclosed that offer a wearable audio output device (e.g., headphones, earphones, and/or the like) with an open design. For example, the device may include an open earcup design that enables ambient noise to pass through the earcup to the listener's ear, such that the listener's ear is not isolated from the environment. The open earcup design may partially or completely surround the listener's ear, and in some examples a portion of the listener's head may be uncovered by the open earcup (e.g., visible through a gap), although the gap in the open earcup may optionally be covered by a layer of fabric or other material without departing from the disclosure. To generate the output audio while maintaining comfort, and without creating a significant physical separation between the ear and the external environment, the device includes a floating audio component configured to generate the output audio in a direction of the listener's ear without contacting the listener's ear.

Due to the open earcup design and a lack of passive isolation separating the listener's ear from the environment, the listener may perceive more ambient noise relative to a traditional closed headphone design. While this may be desirable in certain circumstances, in others, detection of less ambient noise may be desirable. To improve an audio quality of the output audio and/or reduce an amount of ambient noise perceived by the listener, the device may be configured to perform active noise cancellation (ANC) processing. For example, the device may include one or more feed forward microphones and/or one or more feedback microphones that enable the device to perform feed forward ANC processing, feedback ANC processing, and/or hybrid ANC processing. In addition, the floating audio component may include an acoustic structure that is configured to direct the output audio in the direction of the listener's ear and/or position the feedback microphone(s) closer to the listener's ear. Such ANC (or other cancellation/noise reduction operations) may be manually activated (and deactivated) by a user controlling the headphones (or a connected device) and/or may be automatically activated by the headphones (or a connected device) depending on system configuration.

To reduce sound leakage of the output audio caused by the open earcup design, the device may include multiple audio transducers in a single earcup that enable the device to generate output audio using beamforming. For example, the earcup may include two audio transducers that are configured to generate constructive interference to increase a first volume level in a first direction of the listener's ear and destructive interference to decrease a second volume level in opposite directions. Thus, the device tries to maximize a ratio between the first volume level and the second volume level so that the output audio is focused or directed to the listener's ear and away from the environment.

FIG. 1A illustrates a wearable audio output device according to embodiments of the present disclosure. As illustrated in FIG. 1A, a wearable audio output device 110 (e.g., device 110) may be configured to generate output audio using an open headphone design. For example, the device 110 may include an open earcup 112 that at least partially surrounds a user's ear without fully covering the user's ear and/or certain components of the device 110, such as a floating audio component 114 and/or an acoustic structure 116. For example, while typical headphones include a housing that fully encloses the user's ear and/or the audio components, the open earcup 112 is configured to have an open or "backless" design to allow ambient noise (e.g., environmental noise) and improve a comfort of the user.

Thus the open earcup 112 does not fully physically separate the ear from the environment. Such an open design may allow external sound to pass through to the ear, though such noise may be reduced if ANC operations are active, sounds such as sirens, loud sudden noises, are more likely to reach the ear, allowing the user to maintain a better understanding of his/her environment. While the earcup 112 may be covered with a fabric (e.g., mesh) or other material for aesthetic purposes, such covering should not significantly impact the ability of sound to pass through the gap provided between the floating audio component 114 and the acoustic structure 116.

As used herein, while component 114 is referred to as a "floating" audio component, component 114 is typically physically connected to earcup 112, for example using a connector such as a connecting rod, structure, hinge, ball socket, and/or the like. Thus, the floating audio component 114 is referred to as "floating" due to its physical proximity to the user's ear despite the floating audio component 114 being configured to not directly contact the user's ear. However, the disclosure is not limited thereto and in some examples the floating audio component 114 may be kept in close proximity to the earcup 112 without having a rigid connection to the earcup 112 and/or without being physically connected to the earcup 112. For example, the floating audio component 114 may be held in place in close proximity to the earcup 112 using magnets or other components that do not physically connect the open earcup 112 to the floating audio component 114 without departing from the disclosure. Additionally or alternatively, while the floating audio component 114 is illustrated as having a single connection point to the open earcup 112, the disclosure is not limited thereto and the floating audio component 114 may have two or more points of contact without departing from the disclosure.

As described in greater detail below with regard to FIGS. 2A-2D, the open earcup 112 may correspond to multiple different shapes without departing from the disclosure. In addition, the examples illustrated in FIG. 1A and FIGS. 2A-2D are intended to conceptually illustrate some examples of the wearable audio output device 110 and the disclosure is not limited thereto. Thus, the device 110 may include modifications of the device 110, the open earcup 112, the floating audio component 114, and/or the acoustic structure 116 without departing from the disclosure.

In some examples, the device 110 may include a gap between a first edge of the open earcup 112 and a second edge of the floating audio component 114, such that a portion of the user's head is uncovered through the gap. For example, a portion of the user's head (e.g., portion of the user's ear) may be visible through the device 110 (e.g., via a gap between the first edge of the open earcup 112 and second edge of the floating audio component 114) without departing from the disclosure. However, the disclosure is not limited thereto, and in some examples the device 110 may include an opaque structure or layer that is configured to block the user's head from view while enabling sound to reach the user's head. For example, the device 110 may include a layer (e.g., fabric, mesh, other materials, etc.) that covers the gap between the open earcup 112 and the floating audio component 114 while allowing the ambient noise (e.g., environmental noise) to pass through to the user.

The floating audio component 114 may include (i) one or more components configured to perform noise cancellation, (ii) one or more audio transducers configured to generate the output audio in a direction of the user's ear, and/or (iii) the acoustic structure 116, which may be configured to direct the output audio in a first direction of the user's ear. Thus, the floating audio component 114 may be configured to generate the output audio directed toward the user's ear without contacting the user's ear. In one embodiment of the headphones 110, the floating audio component 114 is configured such that it does not touch the user's ear while the headphones are being worn. This may improve the user's comfort when wearing the headphones 110. In addition, the open earcup 112 allows environmental noise to pass through the gap to the user's ear, enabling the user to perceive the environmental noise in addition to the output audio. To attenuate (e.g., cancel, dampen, reduce, remove, and/or the like) the environmental noise, the device 110 may be configured to perform active noise cancellation (ANC) processing using one or more feedforward microphones, one or more feedback microphones, and/or additional components without departing from the disclosure.

In addition to allowing the environmental noise to pass through to the user's ear, the open earcup 112 may also allow the output audio to leak from the device 110 into the environment (e.g., audio leakage). For example, the open earcup 112 may reduce an amount of passive interference associated with the device 110, as there may be fewer layers and/or components configured to block the output audio from traveling in a second direction away from the user's head. To illustrate an example, the device 110 may not include an acoustically reflective housing and/or other dampening materials positioned between the floating audio component 114 and the environment to contain the output audio. To reduce an amount of leakage, the device 110 may generate the output audio by performing beamforming as described below.

Figure 1B:
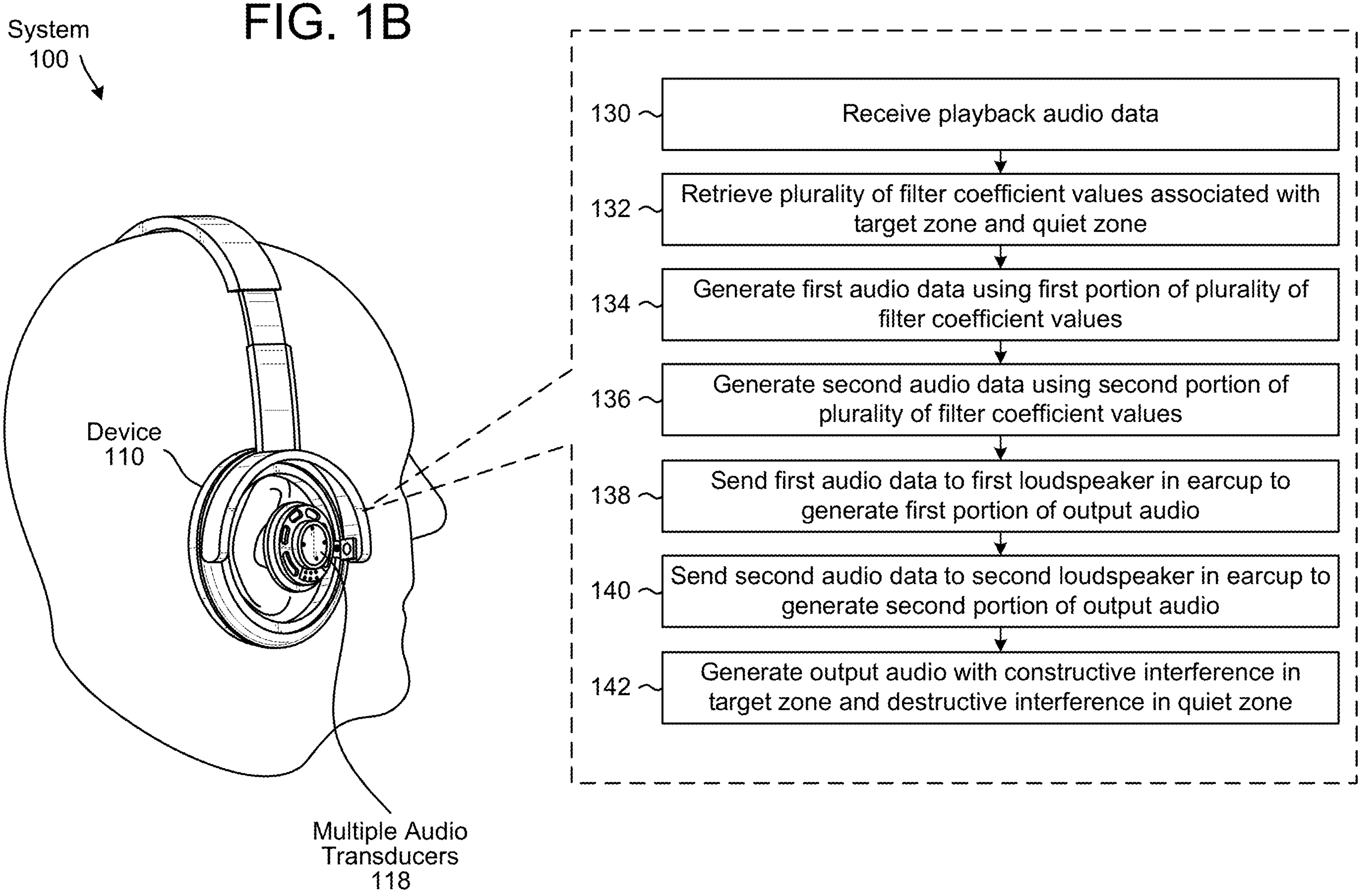
FIG. 1B illustrates a wearable audio output device configured to generate output audio using beamforming according to embodiments of the present disclosure.

FIG. 1B illustrates a wearable audio output device configured to generate output audio using beamforming according to embodiments of the present disclosure. As illustrated in FIG. 1B, the device 110 may include multiple audio transducers 118 that enable the device 110 to perform beamforming and reduce the amount of leakage. For example, the device 110 may include two audio transducers configured to generate constructive interference in the first direction toward the user's ear and to create destructive interference in the second direction(s) away from the user's ear. This effectively targets the output audio towards the user while reducing a volume of the output audio in the second direction(s).

To enable beamforming, the device 110 may determine a target zone (e.g., first direction(s) toward the user's ear) and a quiet zone (e.g., second direction(s) away from the user's ear), determine a first matrix of transfer functions associated with the target zone, determine a second matrix of transfer functions associated with the quiet zone, and determine a plurality of filter coefficient values using the first matrix and the second matrix. For example, the device 110 may solve an optimization problem and/or perform other steps to generate the plurality of filter coefficient values without departing from the disclosure. The device 110 may store the plurality of filter coefficient values and use these filter coefficient values when generating the output audio.

To perform beamforming, the device 110 may receive (130) playback audio data and may retrieve (132) the plurality of filter coefficient values associated with a target zone and a quiet zone. The device 110 may generate (134) first audio data using a first portion of the plurality of filter coefficient values and the playback audio data and may generate (136) second audio data using a second portion of the plurality of filter coefficient values and the playback audio data. The device 110 may send (138) the first audio data to a first audio transducer 118*a* in a first earcup 112*a* to generate a first portion of output audio and may send (140) the second audio data to a second audio transducer 118*b* in the first earcup 112*a* to generate a second portion of the output audio. Thus, the device 110 may generate (142) output audio with constructive interference in the target zone and destructive interference in the quiet zone, targeting the output audio at the user's ear while reducing a leakage caused by the open earcup 112.

While FIG. 1B illustrates an example of performing beamforming in a single earcup (e.g., first earcup 112*a*), the disclosure is not limited thereto and the device 110 may perform the same steps to generate second output audio in a second earcup 112*b* without departing from the disclosure. For example, the device 110 may receive second playback audio data corresponding to the second earcup 112*b*, retrieve a second plurality of filter coefficient values associated with the second earcup 112*b*, generate third audio data and fourth audio data using the second playback audio data and the second plurality of filter coefficient values, generate a first portion of second output audio using the third audio data, and generate a second portion of the second output audio using the fourth audio data. Thus, each earcup of the device 110 may operate independently to perform beamforming and generate output audio, although the disclosure is not limited thereto.

In some examples, the device 110 may communicate with a second device (not illustrated), such as a smartphone, smart watch, or similar device, using a wireless connection, which may be a Bluetooth, NFMI, or similar connection or a wired connection, although the disclosure is not limited thereto. The present disclosure may refer to particular Bluetooth protocols, such as classic Bluetooth, Bluetooth Low Energy ("BLE" or "LE"), Bluetooth Basic Rate ("BR"), Bluetooth Enhanced Data Rate ("EDR"), synchronous connection-oriented ("SCO"), and/or enhanced SCO ("eSCO"), but the present disclosure is not limited to any particular Bluetooth or other protocol. The second device may communicate with one or more remote device(s) 120, which may be server devices, via a network 199, which may be the Internet, a wide- or local-area network, or any other network. The device 110 may play output audio using one or both earcups without departing from the disclosure.

In the examples described above, the device 110 may correspond to a set of headphones that include two earcups connected by a headband. For example, the headphones may include a first earcup, a second earcup, and a single wireless transmitter associated with both the first earcup and the second earcup, wherein the wireless transmitter is configured to transmit data to and/or receive data from other devices. The present disclosure may differentiate between a "right earcup," meaning a headphone component disposed in or near a right ear of a user, and a "left earcup," meaning a headphone component disposed in or near a left ear of the user. The disclosure is not limited thereto, however, and in other examples a set of headphones may correspond to two separate earphones that are not physically connected to each other. For example, a first earphone 110*a* may include a first wireless transmitter and a second earphone 110*b* may include a second wireless transmitter without departing from the disclosure.

As used herein, headphone components that are capable of wireless communication with both the second device and/or each other are referred to as "wireless earphones," but the term "earphone" does not limit the present disclosure to any particular type of wired or wireless headphones. Unlike earbuds, which may reside at least part inside the ear, earphones remain external to the ear and may include the floating audio component 114. The present disclosure may further differentiate between a "right earphone," meaning a headphone component disposed in or near a right ear of a user, and a "left earphone," meaning a headphone component disposed in or near a left ear of a user. A "primary" earphone may communicate with a "secondary" earphone, using a first wireless connection (such as a Bluetooth connection), and with the second device (such as a smartphone, smart watch, or similar device), using a second connection (such as a Bluetooth connection). In contrast, the secondary earphone communicates directly with only with the primary earphone and does not communicate using a dedicated connection directly with the smartphone; communication therewith may pass through the primary earphone via the first wireless connection.

In some examples, the primary and secondary earphones may include similar hardware and software; in other instances, the secondary earphone contains only a subset of the hardware/software included in the primary earphone. If the primary and secondary earphones include similar hardware and software, they may trade the roles of primary and secondary prior to or during operation. In some examples, the primary earphone may be referred to as a "first device 110*a*," the secondary earphone may be referred to as a "second device 110*b*," and the smartphone or other device may be referred to as a "third device," although the disclosure is not limited thereto. The first, second, and/or third devices may communicate over a network, such as the Internet, with one or more server devices, which may be referred to as "remote device(s) 120."

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), adaptive interference cancellation (AIC), noise reduction (NR) processing, tap detection, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

Figure 2A:
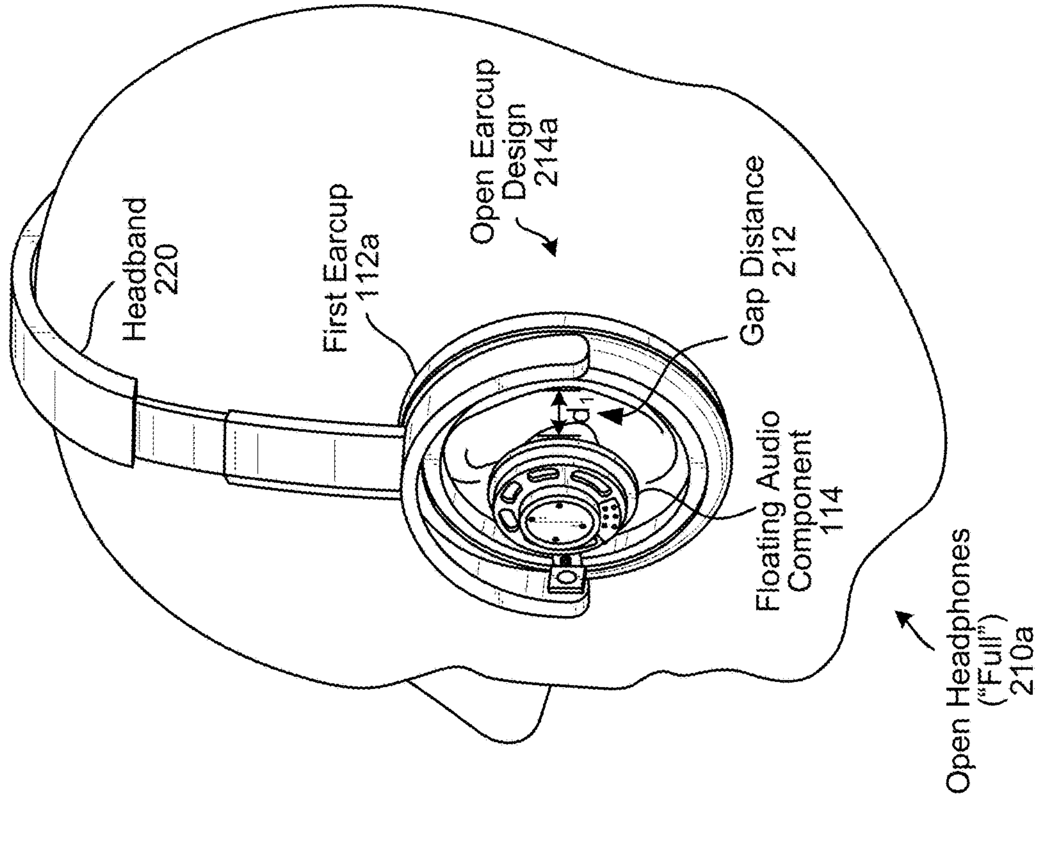
FIGS. 2A-2D illustrate examples of a wearable audio output device according to embodiments of the present disclosure.

FIGS. 2A-2D illustrate examples of a wearable audio output device according to embodiments of the present disclosure. As illustrated in FIG. 2A, in some examples the device 110 may correspond to open headphones (e.g., "full") 210*a*, which include a first open earcup design 214*a* that fully surrounds the user's ear around the perimeter, leaving a gap for the ear to be exposed to the environment in a direction of the side of the user's head. For example, the user's head may be visible between a first edge of the open earcup 112 and a second edge of the floating audio component 114. As illustrated in FIG. 2A, the gap may have a gap distance 212, although the disclosure is not limited thereto and the gap distance 212 may vary without departing from the disclosure. While FIG. 2A only illustrates a single earcup 112*a*, the device 110 may include a second earcup 112*b* (not illustrated) on the other side of the user's head, which is connected to the first earcup 112*a* by a headband 220.

As illustrated in FIG. 2A, the device 110 may include a first earcup 112*a* (e.g., first open earcup, first structure, etc.) configured to contact the user's head at a first location and at least partially surrounding a first ear of the user, a second earcup 112*b* (e.g., second open earcup, second structure, etc.) configured to contact the user's head at a second location and at least partially surrounding a second ear of the user, and the headband 220 (e.g., third structure) linking the first earcup 112*a* to the second earcup 112*b*. As illustrated in FIG. 2A, the device 110 may also include the floating audio component 114 (e.g., housing), which is connected to the first earcup 112*a* and may include audio transducer(s), the acoustic structure 116, feedforward microphone(s), feedback microphone(s), and/or additional components.

Figure 2B:
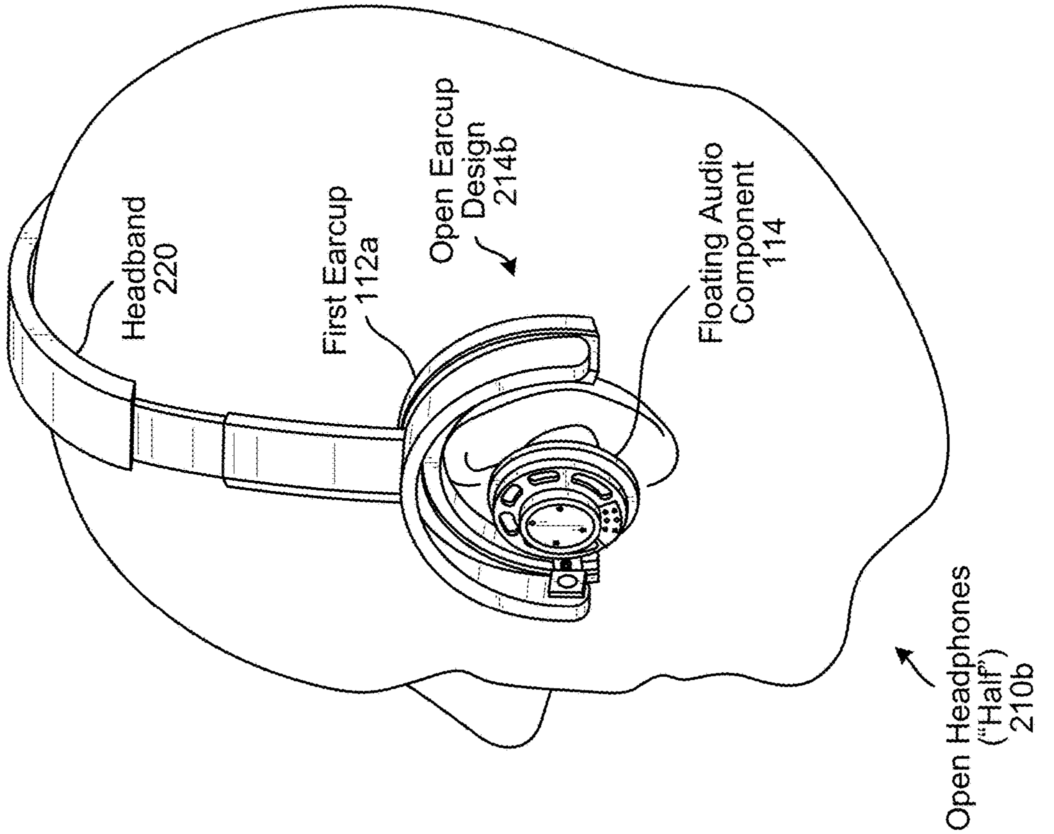

While FIG. 2A illustrates an example in which the device 110 includes the first open earcup design 214*a* that fully surrounds or encircles the user's ear, the disclosure is not limited thereto and in other examples the earcup may only partially surround the user's ear without departing from the disclosure. For example, in some examples the device 110 may include an earcup that defines an oval shape (e.g., circle, oval, ellipse, etc.) that surrounds the user's ear, while in other examples the device 110 may include an earcup that defines only a portion of the oval shape (e.g., ¾, ½, ⅓, etc.) without departing from the disclosure. As illustrated in FIG. 2B, the device 110 may correspond to open headphones ("half") 210*b*, which includes a second open earcup design 214*b* that only surrounds an upper portion of the user's ear. Additionally or alternatively, the device 110 may correspond to open headphones ("¾") 210*c*, which includes a third open earcup design 214*c* that defines a majority of an oval shape while missing a portion of the oval shape, as illustrated in FIG. 2C.

Figure 2C:
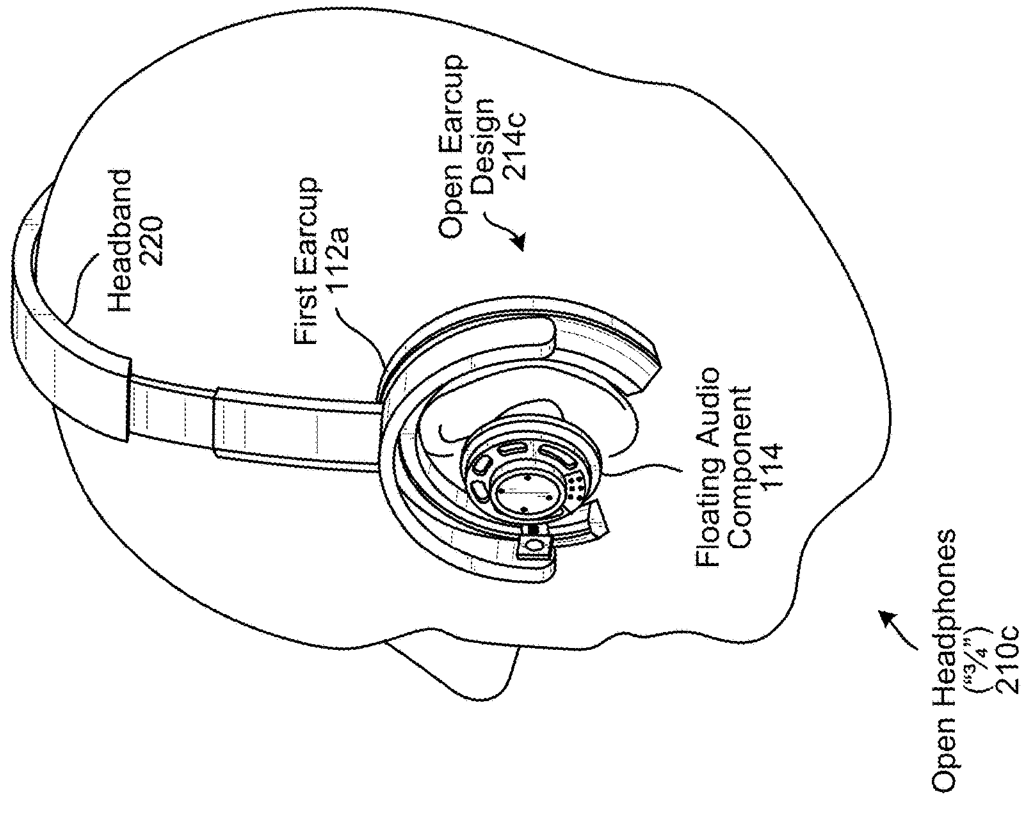
Figure 2D:
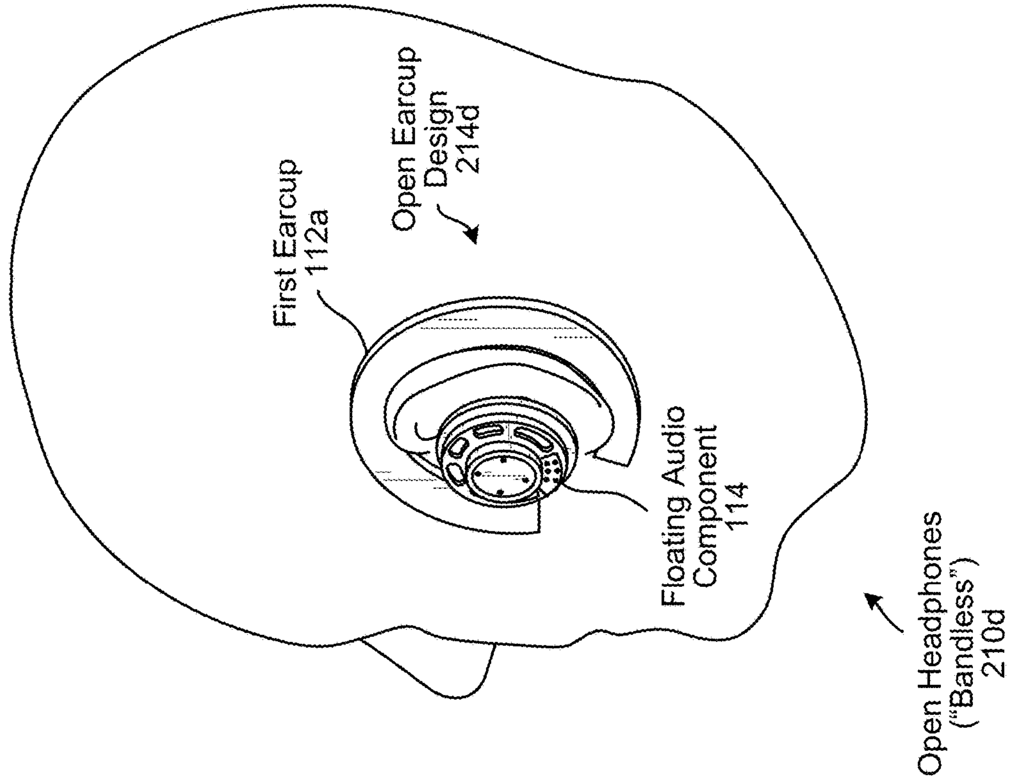

While FIGS. 2A-2C illustrate examples of the device 110 comprising two earcups 112*a*/112*b* connected by a headband 220, the disclosure is not limited thereto. In some examples, the device 110 may include two earcups 112*a*/112*b* that are not connected to each other by a headband or any mechanical structure without departing from the disclosure. As illustrated in FIG. 2D, the device 110 may correspond to open headphones ("bandless") 210*d*, which includes a fourth open earcup design 214*d* that surrounds a portion of the user's ear. Unlike the previous examples, a first earcup 112*a* of the fourth headphones 210*d* is not physically connected to the second earcup 112*b*. Instead, the first earcup 112*a* is configured to contact the user's head at the first location and at least partially surround the first ear of the user, such that the first earcup 112*a* remains in a fixed position relative to the first ear without the headband 220. Similarly, the second earcup 112*b* is configured to contact the user's head at the second location and at least partially surround the second ear of the user, such that the second earcup 112*b* remains in a fixed position relative to the second ear without the headband 220. However, the disclosure is not limited thereto, and in other examples the device 110 may include only a single earcup 112 without departing from the disclosure.

Figure 3:
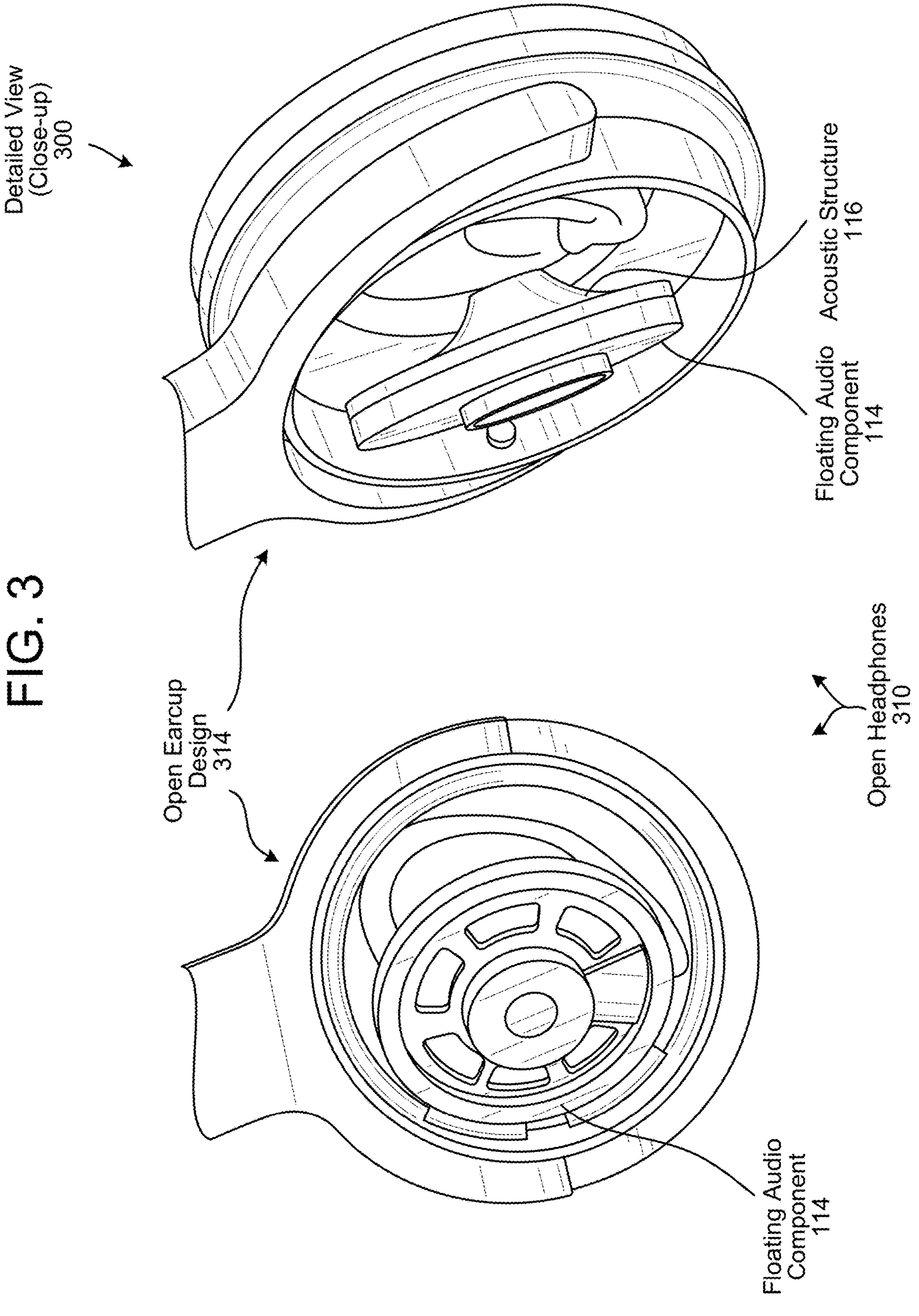
FIG. 3 illustrates examples of a floating audio component and an acoustic structure included in a wearable audio output device according to embodiments of the present disclosure.

FIG. 3 illustrates examples of a floating audio component and an acoustic structure included in a wearable audio output device according to embodiments of the present disclosure. FIG. 3 depicts a detailed view (close-up) 300 that illustrates details about open headphones 310, which includes an open earcup design 314 that comprises the open earcup 112, a floating audio component 114, and an acoustic structure 116. For example, FIG. 3 illustrates how the floating audio component 114 is connected to the open earcup 112 in a particular location (e.g., near a front of the oval shape associated with the open earcup 112), how the floating audio component 114 is directed toward the user's ear while remaining separated from the user's ear, and how the acoustic structure 116 may have a funnel shape and be configured to direct the output audio generated by the floating audio component 114 (e.g., audio transducer(s) included in the floating audio component 114) toward the user's ear.

Figure 4:
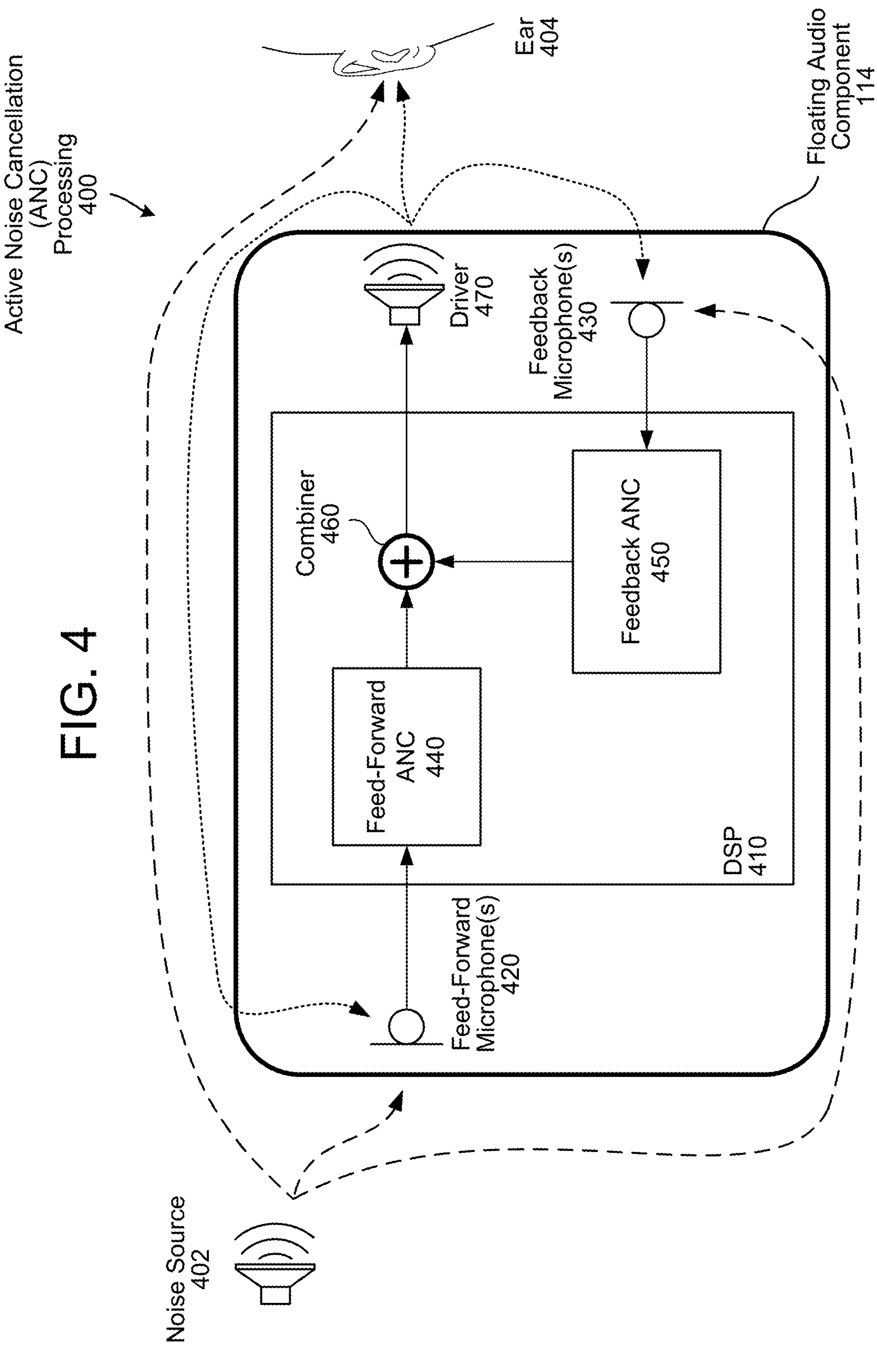
FIG. 4 illustrates an example component diagram of a wearable audio output device configured to perform active noise cancellation according to embodiments of the present disclosure.

FIG. 4 illustrates an example component diagram of a wearable audio output device configured to perform active noise cancellation according to embodiments of the present disclosure. As illustrated in FIG. 4, the device 110 may perform active noise cancellation (ANC) processing 400 to reduce the user's perception of a noise source 402 in an environment of the device 110. In some examples, the ANC processing 400 may detect ambient noise generated by the noise source 402 and may cancel at least a portion of the ambient noise (e.g., reduce a volume of the ambient noise). For example, the ANC processing 400 may identify the ambient noise and generate a signal that mirrors the ambient noise with a phase mismatch, which cancels/reduces the ambient noise due to destructive interference.

As illustrated in FIG. 4, the ANC processing may be performed using feed-forward microphone(s) 420 and/or feedback microphone(s) 430. While FIG. 4 illustrates an example of a single feed-forward microphone 420 and feedback microphone 430, the disclosure is not limited thereto and the device 110 may include multiple feed-forward microphones 420 and/or multiple feedback microphones 430 without departing from the disclosure.

In the example illustrated in FIG. 4, the ambient noise (e.g., ambient sound, environmental noise, etc.) may be captured by the feed-forward microphone(s) 420. As the device 110 does not physically isolate the user's ear 404 from the environment, the ambient noise may also be detected by the ear 404 and/or captured by the feedback microphone(s) 430. For example, the feedback microphone(s) 430 may detect the ambient noise at higher intensity values (e.g., higher volume level) relative to a feedback microphone(s) included in headphones with a closed design that physically isolates the ear 404 from the environment.

The device 110 may perform ANC processing 400 using feed forward ANC processing, feedback ANC processing, hybrid ANC processing, and/or a combination thereof. To illustrate an example of feed forward ANC processing, the device 110 may capture the ambient noise as first audio data using the feed-forward microphone(s) 420 and may apply a feed-forward filter to the first audio data to estimate the ambient noise signal received by the ear 404. For example, the device 110 may determine a transfer function and/or filters that correspond to a difference between first ambient noise captured by the feed-forward microphone(s) 420 and second ambient noise detected by the ear 404. Thus, the device 110 may apply the transfer function/filters to the first audio data to generate second audio data that estimates the ambient noise signal received by the ear 404. To cancel the second audio data, the device 110 may generate third audio data that mirrors the second audio data but has a phase mismatch that will cancel or reduce the second audio data using destructive interference. In the example illustrated in FIG. 4, the feed-forward ANC processing may be performed by a feed-forward ANC component 440, which generates third audio data that is output to a combiner component 460.

To illustrate an example of feedback ANC processing, the device 110 may capture the ambient noise as fourth audio data using a feedback microphone 430, although the disclosure is not limited thereto and the device 110 may include multiple feedback microphones 430 without departing from the disclosure. As the feedback microphone 430 is located in close proximity to the ear 404, the feedback microphone 430 does not need to estimate the ambient noise signal received by the ear 404 as the fourth audio data corresponds to this ambient noise signal. However, unlike the first audio data generated by the feed-forward microphone(s) 420, the fourth audio data generated by the feedback microphone 430 is not limited to the ambient noise. Instead, due to proximity to the ear 404, the fourth audio data includes the ambient noise and a representation of playback audio generated by the driver 470. In order to perform feedback ANC, the device 110 may remove the playback audio recaptured by the feedback microphone 430 (e.g., by performing echo cancellation and/or the like) and generate fifth audio data that corresponds to the ambient noise. To cancel the fifth audio data, the device 110 may generate sixth audio data that mirrors the fifth audio data but has a phase mismatch that will cancel or reduce the fifth audio data using destructive interference. In the example illustrated in FIG. 4, the feedback ANC processing may be performed by a feedback ANC component 450, which generates sixth audio data that is output to the combiner component 460. While FIG. 4 does not illustrate playback audio data, the feedback ANC 450 may receive the playback audio data and use the playback audio data to generate the fifth audio data without departing from the disclosure.

As illustrated in FIG. 4, a digital signal processing (DSP) component 410 may include the feed-forward ANC component 440, the feedback ANC component 450, and the combiner component 460. The combiner component 460 may combine the third audio data generated by the feed-forward ANC component 440 and the sixth audio data generated by the feedback ANC component 450 to generate seventh audio data and may send the seventh audio data to the driver 470 to generate output audio. Due to the phase mismatch and/or destructive interference, the output audio generated by the driver 470 may cancel and/or reduce the ambient noise perceived by the ear 404. While not illustrated in FIG. 4, the combiner component 460 may generate the seventh audio data by adding the third audio data and the sixth audio data to playback audio data to be output by the device 110.

In the example illustrated in FIG. 4, the device 110 may perform ANC processing 400 using a combination of feed-forward ANC processing and feedback ANC processing. For example, the combiner component 460 may combine the third audio data generated by the feed-forward ANC component 440 and the sixth audio data generated by the feedback ANC component 450. However, the disclosure is not limited thereto, and in some examples the device 110 may perform ANC processing 400 using hybrid ANC processing without departing from the disclosure. For example, instead of separately generating the third audio data and the sixth audio data, during hybrid ANC processing the DSP component 410 may jointly perform feed-forward ANC processing and feedback ANC processing to generate a single output (e.g., output audio data). In some examples, during hybrid ANC processing the DSP component 410 may compare first audio data generated by the feed-forward microphone(s) 420 with second audio data generated by the feedback microphone 430 and/or the playback audio data, although the disclosure is not limited thereto.

Figure 5:
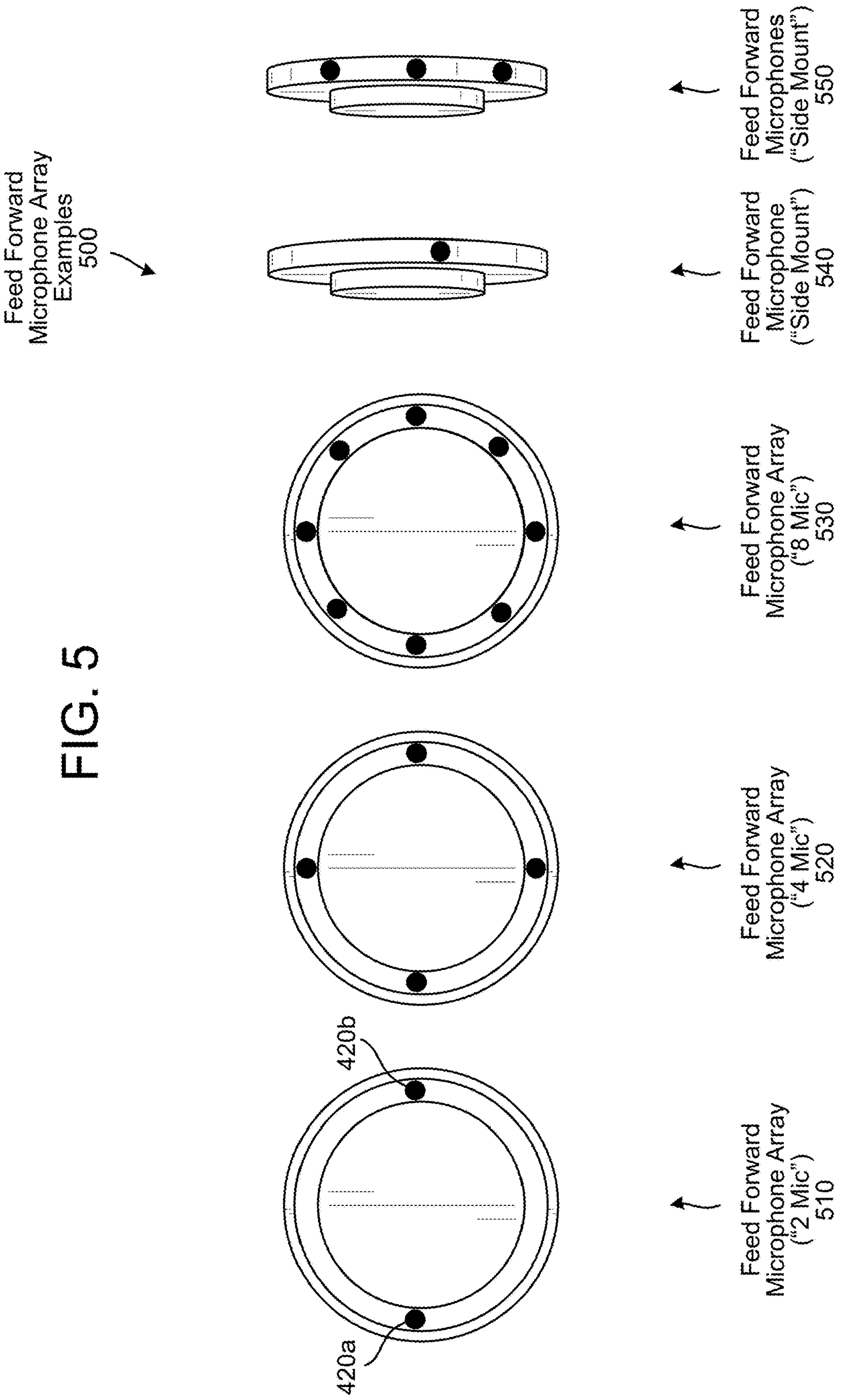
FIG. 5 illustrates examples of feed forward microphone arrays according to embodiments of the present disclosure.

FIG. 5 illustrates examples of feed forward microphone arrays according to embodiments of the present disclosure. As described above with regard to FIG. 4, the device 110 may include one or more feed forward microphone(s) 420 to enable the device 110 to perform active noise cancellation (ANC) processing. For example, the device 110 may include the feed forward microphone(s) 420 in a variety of configurations, as depicted by feed forward microphone array examples 500 illustrated in FIG. 5.

As illustrated in FIG. 5, the device 110 may include a first feed forward microphone array ("2 mic") 510 that includes two feed forward microphones **420*a*-420*b*. In the example illustrated in FIG. 5, the feed forward microphones 420*a*-420*b* are positioned on either side of the floating audio component 114, but the disclosure is not limited thereto and the position(s) of the feed forward microphones 420*a*-420*b*** may vary without departing from the disclosure.

In some examples, the device 110 may include a second feed forward microphone array ("4 mic") 520 that includes four feed forward microphones **420*a*-420*d* without departing from the disclosure. In the example illustrated in FIG. 5, the feed forward microphones 420*a*-420*d* are positioned at fixed intervals around a perimeter of the floating audio component 114, but the disclosure is not limited thereto and the position(s) of the feed forward microphones 420*a*-420*d*** may vary without departing from the disclosure.

In other examples, the device 110 may include a third feed forward microphone array ("8 mic") 530 that includes eight feed forward microphones **420*a*-420*h* without departing from the disclosure. In the example illustrated in FIG. 5, the feed forward microphones 420*a*-420*h* are positioned at fixed intervals around a perimeter of the floating audio component 114, but the disclosure is not limited thereto and the position(s) of the feed forward microphones 420*a*-420*h* may vary without departing from the disclosure. Additionally or alternatively, the exact number of the feed forward microphones 420** may vary without departing from the disclosure.

While the feed forward microphone arrays 510/520/530 illustrate examples of the feed forward microphones 420 being positioned along a front face of the floating audio component 114, the disclosure is not limited thereto and the feed forward microphones 420 may be positioned along other surfaces of the floating audio component 114 without departing from the disclosure. For example, FIG. 5 illustrates a first example of a feed forward microphone ("side mount") 540 that may be positioned in a null along a side of the floating audio component 114. However, the disclosure is not limited thereto and two or more feed forward microphones 420 may be positioned along the side of the floating audio component 114 without departing from the disclosure. For example, FIG. 5 illustrates a second example of multiple feed forward microphones ("side mount") 550 that may be positioned in the null along the side of the floating audio component 114 without departing from the disclosure.

Additionally or alternatively, while FIG. 5 illustrates examples of either (i) feed forward microphones positioned on the front face of the floating audio component 114 or (ii) feed forward microphone(s) positioned on the side of the floating audio component 114, the disclosure is not limited thereto. Instead, in some examples the device 110 may include feed forward microphones positioned on the front face of the floating audio component 114 along with one or more feed forward microphones 420 positioned along the side of the floating audio component 114 without departing from the disclosure.

Figure 6:
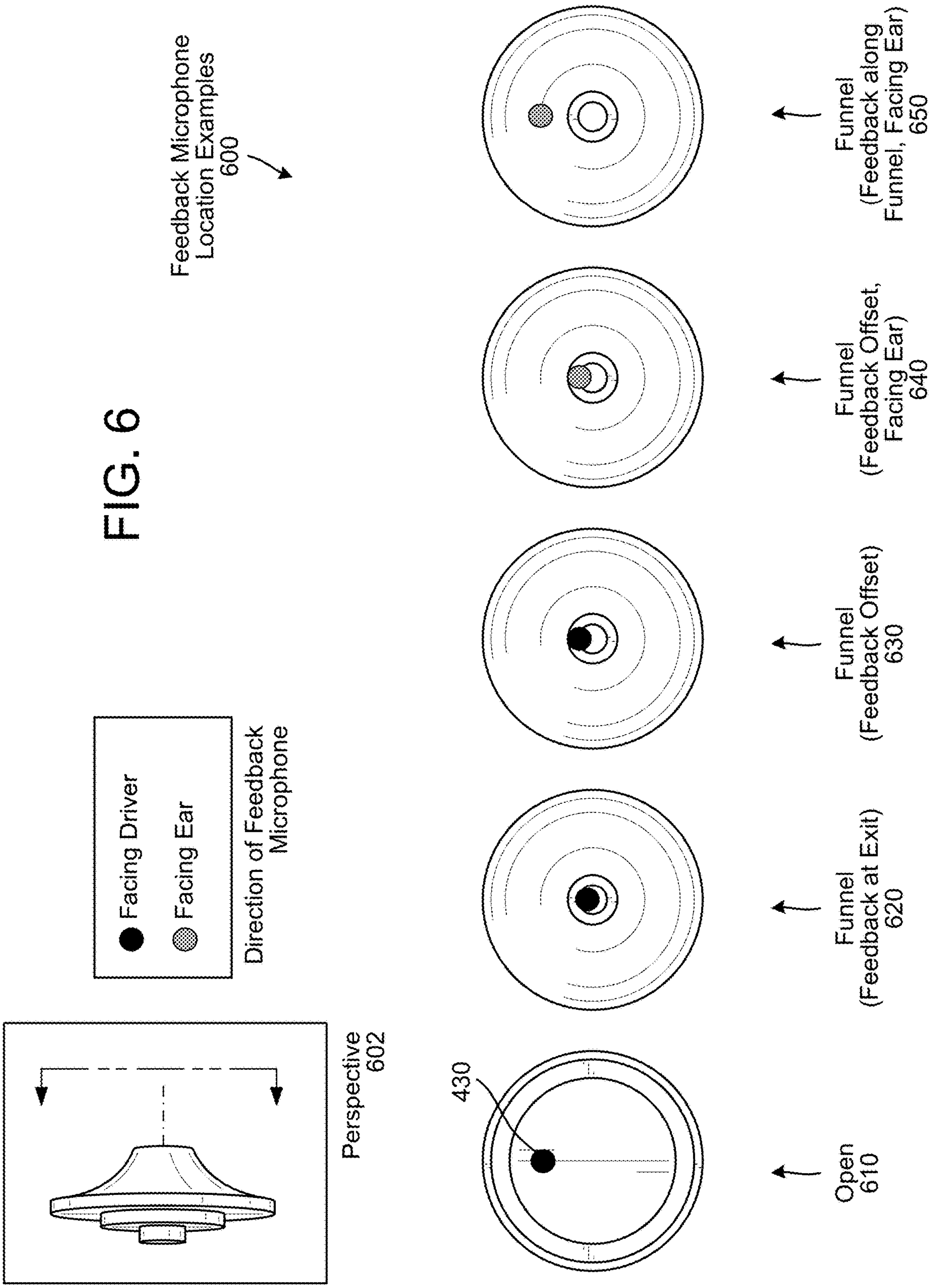
FIG. 6 illustrates examples of feedback microphone locations according to embodiments of the present disclosure.

FIG. 6 illustrates examples of feedback microphone locations according to embodiments of the present disclosure. As described above with regard to FIG. 4, the device 110 may include one or more feedback microphone(s) 430. As illustrated in FIG. 6, the device 110 may include a single feedback microphone 430 in several different positions along the floating audio component 114 and/or the acoustic structure 116 without departing from the disclosure. For example, feedback microphone location examples 600 illustrate examples of the feedback microphone 430 being positioned along an audio transducer (e.g., when the floating audio component 114 does not include the acoustic structure 116), along the acoustic structure 116 facing the driver (e.g., audio transducer), and/or along the acoustic structure 116 facing the user's ear.

As illustrated in FIG. 6, the perspective 602 of the feedback microphone location examples 600 corresponds to a view from inside the user's ear looking out at the floating audio component 114, which may or may not include the acoustic structure 116. For example, an open configuration 610 includes the feedback microphone 430 along the audio transducer while facing the audio transducer, although the exact location of the feedback microphone 430 may vary without departing from the disclosure.

In contrast, a first funnel configuration ("Feedback at Exit") 620 includes the feedback microphone 430 at the exit of the acoustic structure 116, whereas a second funnel configuration ("feedback offset") 630 includes the feedback microphone 430 offset slightly from the exit of the acoustic structure 116. In both the first funnel configuration 620 and the second funnel configuration 630, the feedback microphone 430 is facing the audio transducer. However, the disclosure is not limited thereto, and in a third funnel configuration ("Feedback Offset, Facing Ear") 640 and a fourth funnel configuration ("Feedback along funnel, facing ear") 650, the feedback microphone 430 may be offset slightly from the exit (e.g., 640) and/or positioned along the acoustic structure 116 (e.g., 650) while facing the user's ear without departing from the disclosure.

While FIG. 6 illustrates examples of the feedback microphone 430 positioned relative to the floating audio component 114 and/or the acoustic structure 116, the disclosure is not limited thereto and the device 110 may position the feedback microphone 430 at various locations without departing from the disclosure. Additionally or alternatively, while FIG. 6 illustrates examples of a single feedback microphone 430, the disclosure is not limited thereto and the device 110 may include two or more feedback microphones 430 without departing from the disclosure. For example, the device 110 may position a first feedback microphone 430*a* using the first funnel configuration ("Feedback at Exit") 620 and a second feedback microphone 430*b* using the fourth funnel configuration ("Feedback along funnel, facing ear") 650, although the disclosure is not limited thereto.

As illustrated in the funnel configurations 620/630/640/650, in some examples the device 110 may position the feedback microphone 430 along the acoustic structure 116, such as near a tip of the acoustic structure 116. Thus, in addition to being configured to direct the output audio towards the user's ear, the acoustic structure 116 may also be configured to position the feedback microphone 430 closer to the user's ear than the audio transducer. For example, the acoustic structure 116 may have a funnel shape and a depth of the funnel shape may be chosen based on the distance from the feedback microphone 430 to an expected position of the user's ear, although the disclosure is not limited thereto.

Figure 7:
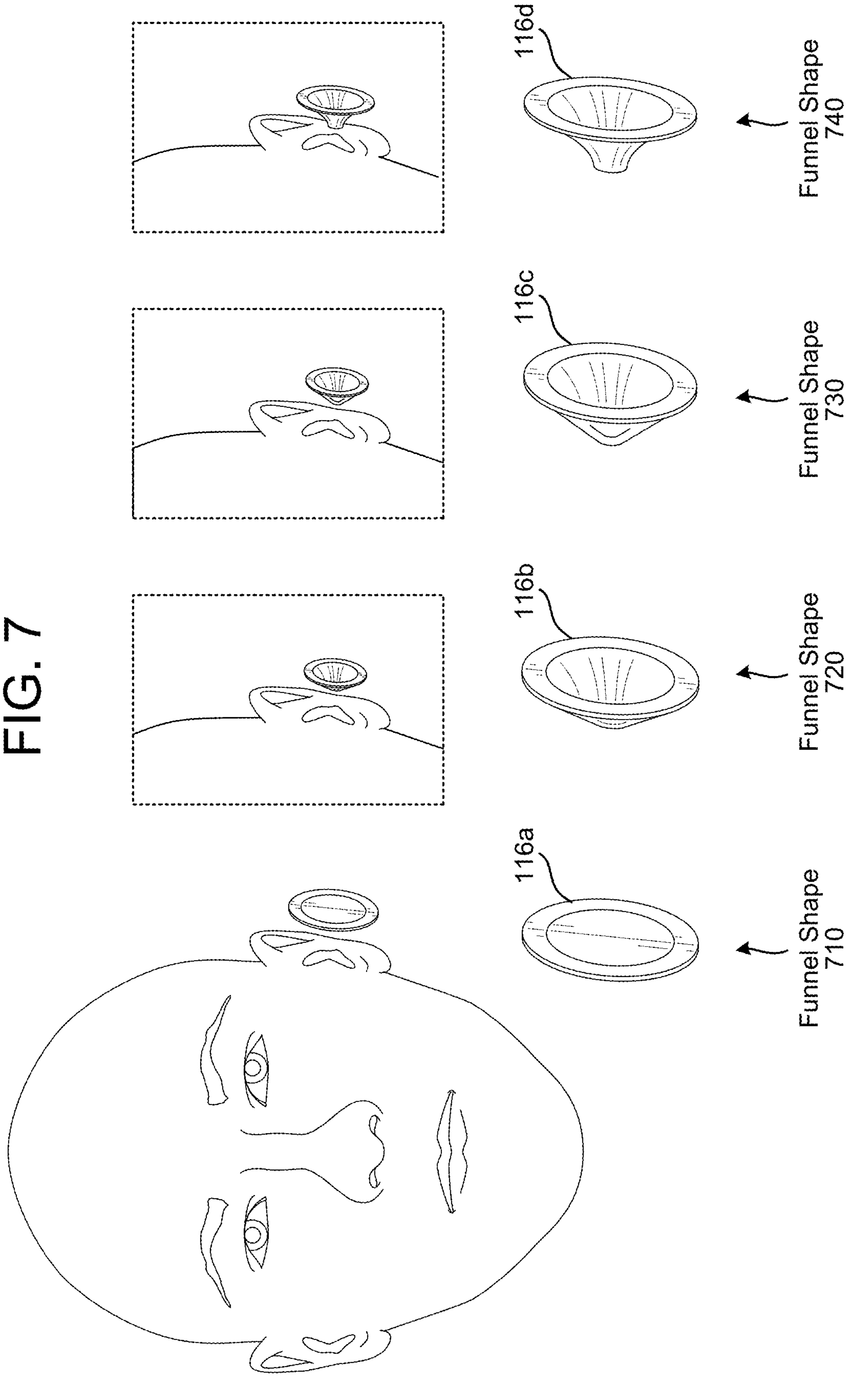
FIG. 7 illustrates examples of funnel shapes of an acoustic structure according to embodiments of the present disclosure.

FIG. 7 illustrates examples of funnel shapes of an acoustic structure according to embodiments of the present disclosure. As illustrated in FIG. 7, a first acoustic structure 116*a* may have a first funnel shape 710, a second acoustic structure 116*b* may have a second funnel shape 720, a third acoustic structure 116*c* may have a third funnel shape 730, and a fourth acoustic structure 116*d* may have a fourth funnel shape 740, although the disclosure is not limited thereto. As illustrated in FIG. 7, the acoustic structure 116 may vary from a flat funnel shape 710 to a deep funnel shape 740, with a longer funnel shape positioning the feedback microphone 430 closer to the user's ear. However, while FIG. 7 illustrates multiple examples of the acoustic structure 116, the disclosure is not limited thereto and the shape of the acoustic structure 116 may vary without departing from the disclosure. As noted above, in one embodiment of the headphones 110, the floating audio component 114 is configured such that it does not touch the user's ear while the headphones are being worn. This includes the end of the funnel. Thus, in certain embodiments of the headphones 110, the end of the funnel does not touch the user's ear while the headphones are being worn.

While FIG. 7 illustrates examples of the acoustic structure 116 having a funnel shape and different depths associated with the funnel, this is intended to conceptually illustrate a simple example and the disclosure is not limited thereto. For example, the acoustic structure 116 may correspond to a funnel shape but may have notches or slits cut out of the funnel shape without departing from the disclosure. Additionally or alternatively, the acoustic structure 116 may be configured to direct the output audio at the user's ear using other shapes or patterns that are distinct from the funnel shape illustrated in FIG. 7 without departing from the disclosure.

Figure 8:
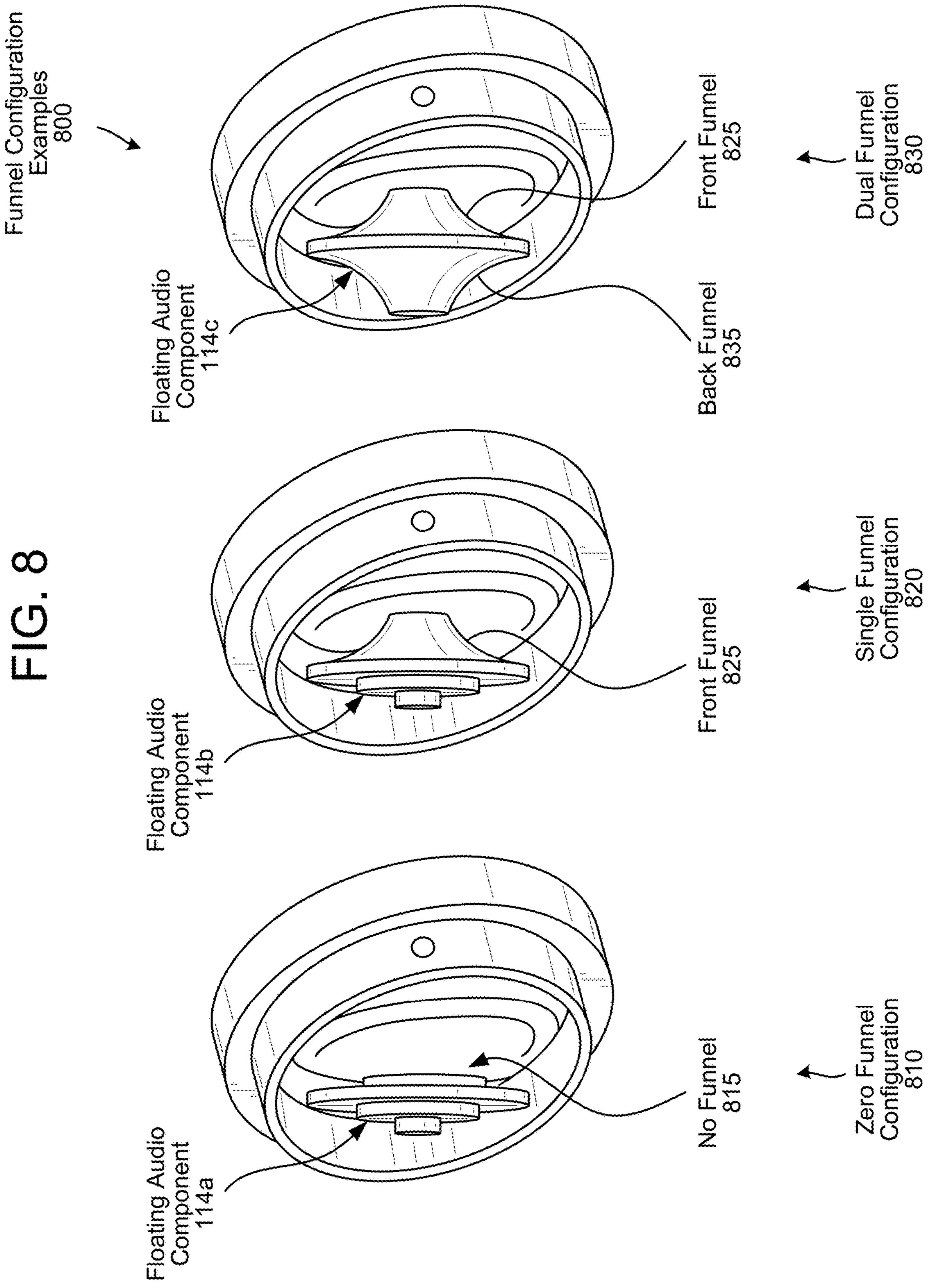
FIG. 8 illustrates examples of funnel configurations according to embodiments of the present disclosure.

FIG. 8 illustrates examples of funnel configurations according to embodiments of the present disclosure. As illustrated in FIG. 8, a first floating audio component 114*a* may have a zero funnel configuration 810, indicating that there is no funnel 815 between the audio transducer and the user's ear. In some examples, however, the device 110 may include an acoustic structure 116 configured to direct the output audio to the user's ear and/or position the feedback microphone 430 closer to the user's ear. For example, a second floating audio component 114*b* may have a single funnel configuration 820 consisting of a front funnel 825, which may direct the output audio toward the user's ear and/or position the feedback microphone 430 in proximity to the user's ear, although the disclosure is not limited thereto.

Including the front funnel 825 may cause internal reflections and/or other effects that may result in an increased leakage into the environment. For example, the front funnel 825 may channel a first portion of the output audio towards the user's ear, while reflecting a second portion of the output audio away from the user's ear and into the environment. To reduce this leakage and/or improve an audio quality of the output audio, a third floating audio component 114*c* may have a dual funnel configuration 830 consisting of the front funnel 825 and a back funnel 835. Thus, the front funnel 825 may direct the output audio toward the user's ear and/or position the feedback microphone 430 in proximity to the user's ear, while the back funnel 835 may be configured to limit the amount of reflections and/or portion of the output audio that is directed away from the user's ear.

While the funnel configuration examples 800 depicted in FIG. 8 illustrate the front funnel 825 and the back funnel 835 using a particular funnel shape, the disclosure is not limited thereto and the shape of the front funnel 825 and/or the back funnel 835 may vary without departing from the disclosure. For example, a depth of the front funnel 825 and/or the back funnel 835 may vary without departing from the disclosure. Additionally or alternatively, the front funnel 825 and/or the back funnel 835 may include slits or cutouts that may improve characteristics of the output audio without departing from the disclosure. In some examples, the position of the floating audio component 114 and/or the acoustic structure 116 may also vary relative to the user's ear without departing from the disclosure.

Figure 9:
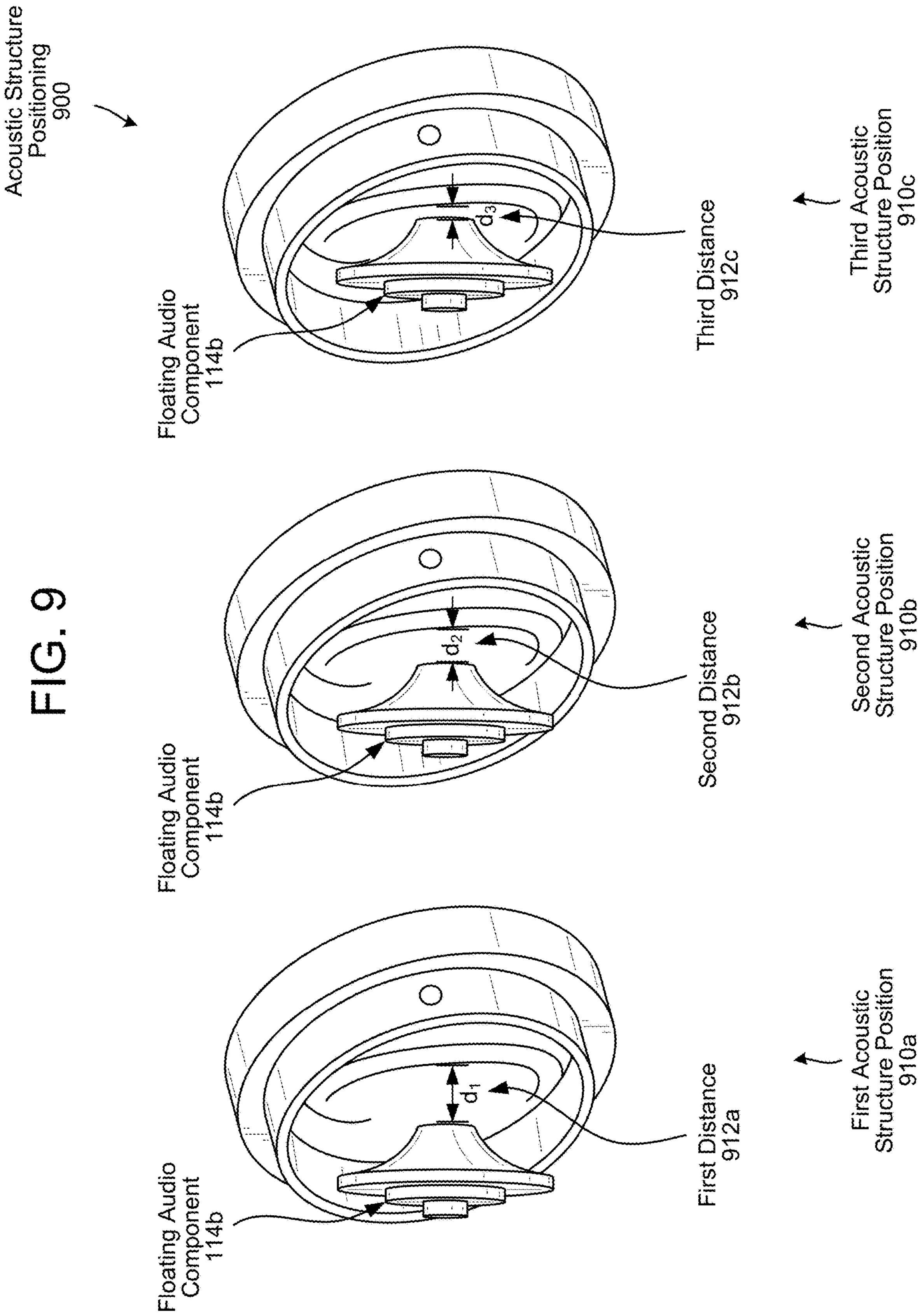
FIG. 9 illustrates examples of positioning an acoustic structure according to embodiments of the present disclosure.

FIG. 9 illustrates examples of positioning an acoustic structure according to embodiments of the present disclosure. Acoustic structure positioning 900 illustrates examples of varying a position of the floating audio component 114*b* and a corresponding acoustic structure 116 relative to the user's ear. For example, FIG. 9 illustrates that the floating audio component 114*b* may be in a first acoustic structure position 910*a* associated with a first distance $d_1$ 912*a*, a second acoustic structure position 910*b* associated with a second distance $d_2$ 912*b*, or a third acoustic structure position 910*c* associated with a third distance $d_3$ 912*c* without departing from the disclosure. Thus, the device 110 may include a component that allows the user (or the device 110 if so configured) to modify the distance between the acoustic structure 116 included in the floating audio component 114*b* and the user's ear from the first distance 912*a* to the third distance 912*c* to improve the user's comfort, audio performance of the headphones 110, etc. Such movement may involve connecting the floating audio component 114 to the earcup 112 using a hinge mechanism, which may allow the floating audio component 114 to swing like a door closer to or farther away from the ear. In addition, or in the alternative, such movement may involve connecting the floating audio component 114 to the earcup 112 using a mechanism that allows the floating audio component 114 to push in toward the ear or pull out away from the ear without altering the angle between the floating audio component 114 and the head.

In some examples, the device 110 may include a fixed assembly between the floating audio component 114 and the open earcup 112. Thus, the position of the acoustic structure 116 relative to the device 110 may be fixed and a distance between the acoustic structure 116 and the user's ear may only vary based on a position of the user's ear. However, the disclosure is not limited thereto, and in other examples the device 110 may include components configured to move the floating audio component 114 relative to the open earcup 112 without departing from the disclosure, enabling the device 110 to provide additional customization for an individual user. For example, the device 110 may position the floating audio component 114 at a first position for a first user and at a second position for a second user without departing from the disclosure.

In some examples, the device 110 may be configured to adjust an angle associated with the floating audio component 114 without departing from the disclosure. For example, the device 110 may be configured to adjust the angle of the floating audio component 114 relative to the ear, similar to how the device 110 may adjust the distance from the acoustic structure to the ear as illustrated in FIG. 9. Additionally or alternatively, while the floating audio component 114 is illustrated as having a single connection point to the open earcup 112, the disclosure is not limited thereto and the floating audio component 114 may have two or more points of contact without departing from the disclosure. Thus, the floating audio component 114 may have different degrees of freedom without departing from the disclosure.

While FIGS. 7-9 illustrate examples of the acoustic structure 116 corresponding to a funnel (e.g., having a funnel shape), the disclosure is not limited thereto. In some examples, the device 110 may include other acoustic structures 116 without departing from the disclosure. For example, the device 110 may include a single acoustic structure similar to the single funnel configuration, except the front funnel 825 may be replaced by an acoustic structure such as a grid structure (e.g., grill). For example, the grid structure may include individual cells and may be configured to direct the output audio towards the ear. In addition to directing the output audio using the cells, the grid structure may be configured to mount the feedback microphone closer to the ear. However, the disclosure is not limited thereto and the acoustic structure may be configured to mount the feedback microphone closer to the ear without directing the output audio in any way without departing from the disclosure.

Additionally or alternatively, the device 110 may include additional acoustic structures that are configured to reduce audio leakage without departing from the disclosure. In some examples, the device 110 may include an expansion chamber, as described below with regard to FIG. 10. In other examples, the device 110 may include slots, mesh, and/or other components without departing from the disclosure, as described below with regard to FIG. 11. Thus, the device 110 may include a variety of acoustic structures and/or a combination of acoustic structure that perform different functions and reduce audio leakage in different ways. To illustrate an example, the back funnel 835 may be replaced by other acoustic structures such as an expansion chamber and/or mesh that is configured to match the front and back radiation from the drivers so that the drivers will still be dipole at high frequencies.

Figure 10:
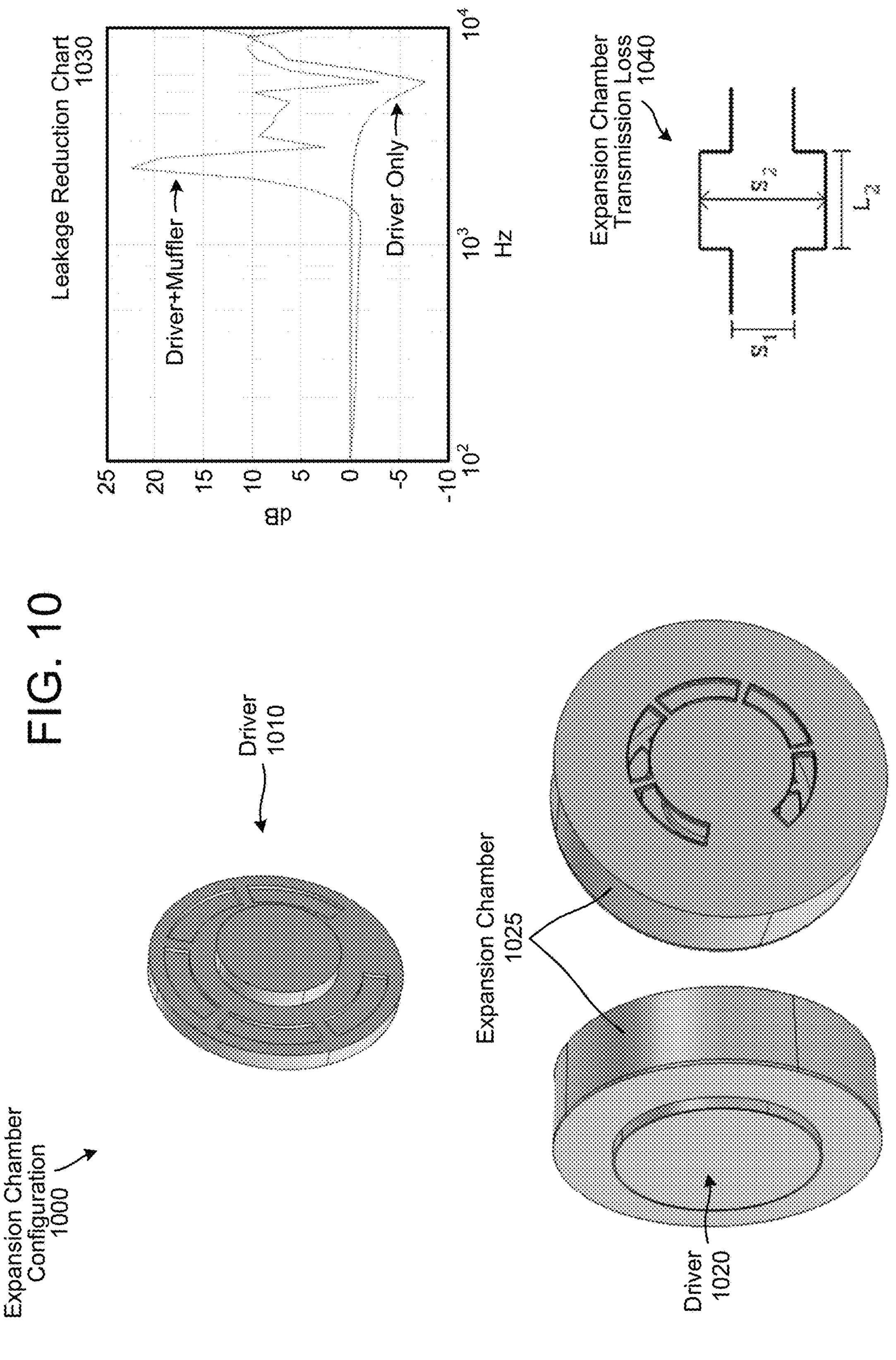
FIG. 10 illustrates examples of reducing audio leakage using an expansion chamber according to embodiments of the present disclosure.

FIG. 10 illustrates examples of reducing audio leakage using an expansion chamber according to embodiments of the present disclosure. In some examples, the device 110 may include an expansion chamber configured to reduce an audio leakage of the device 110. FIG. 10 illustrates a comparison between a driver only configuration (e.g., driver 1010) and an expansion chamber configuration 1000 (e.g., driver 1020 and expansion chamber 1025) to illustrate the potential leakage reduction resulting from adding the expansion chamber 1025.

As illustrated in FIG. 10, the expansion chamber 1025 may surround the driver 1020 and may be configured to perform leakage reduction with a minimal or low impact on the output audio perceived by the user. While the expansion chamber 1025 increases an overall size of the driver and/or housing due to the additional structure surrounding the driver 1020, the expansion chamber configuration 1000 reduces the amount of leakage associated with the device 110. For example, leakage reduction chart 1030 illustrates that the expansion chamber configuration 1000 (e.g., "Driver+Muffler") is noticeably improved over the driver 1010 on its own (e.g., "Driver Only").

In some examples, the device 110 may tune a bandwidth of the leakage based on an area ratio and length associated with the expansion chamber 1025. For example, expansion chamber transmission loss 1040 illustrates an example of a pipe area (e.g., $S_1$) followed by a chamber area (e.g., $S_2$), with a length of the chamber area depicted as $L_2$. An expansion ratio m may be calculated as the chamber area divided by the pipe area (e.g., $m=S_2/S_1$). Using these parameters, a transmission loss may be calculated as show below:

$$TL = 10\log_{10}\left[\frac{1}{4}\left(4\cos^2(kl) + \left(m + \frac{1}{m}\right)\sin^2(kl)\right)\right] \quad [1]$$

In some examples, the expansion chamber may have a first expansion ratio (e.g., m=10) and a first length (e.g., $L_2$=20 mm), although the disclosure is not limited thereto.

Figure 11:
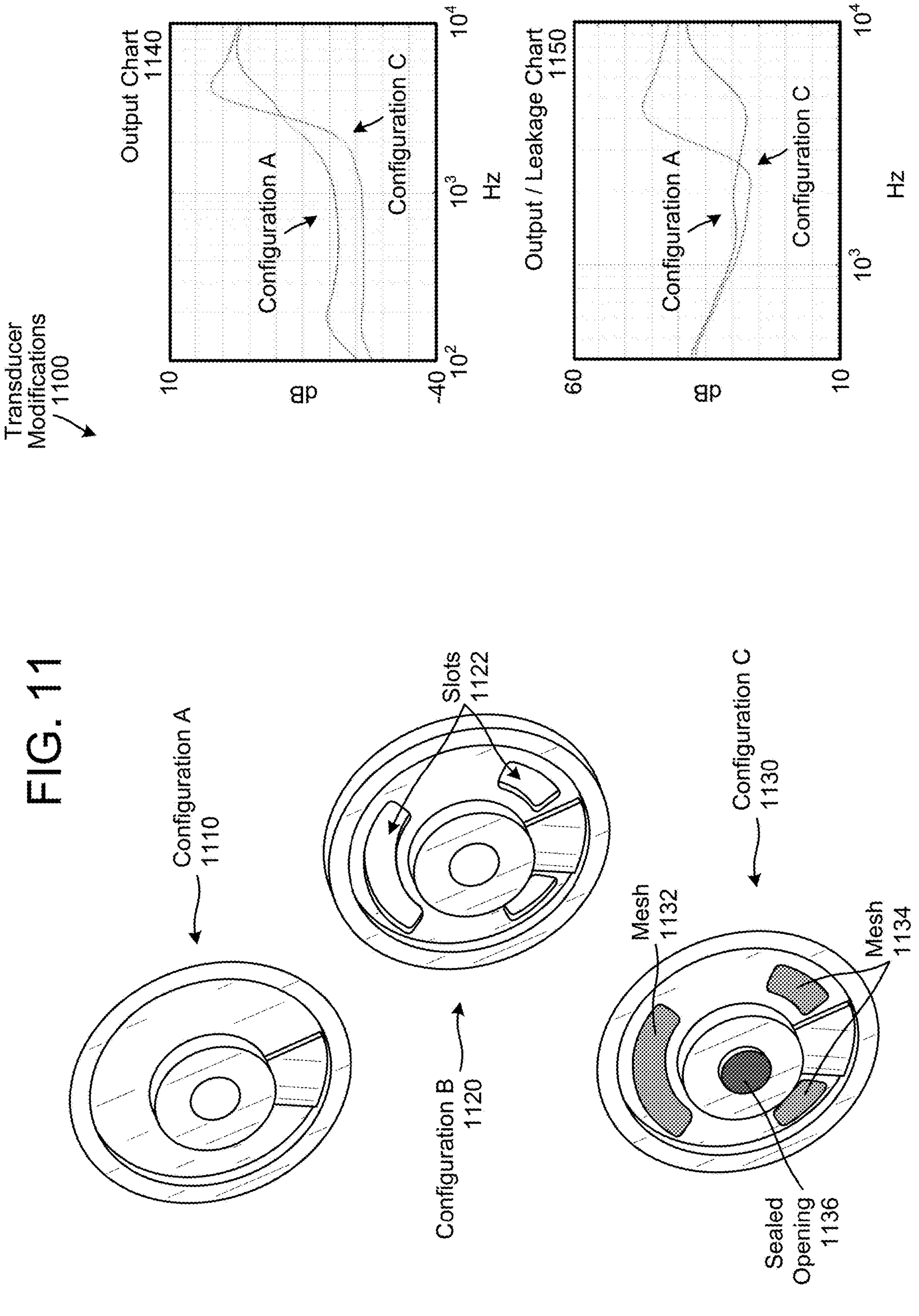
FIG. 11 illustrates examples of reducing audio leakage by performing transducer modifications according to embodiments of the present disclosure.

FIG. 11 illustrates examples of reducing audio leakage by performing transducer modifications according to embodiments of the present disclosure. As illustrated in FIG. 11, the device 110 may include transducer modifications 1100 that may increase an output level and/or reduce the audio leakage. For example, a first configuration ("Configuration A") 1110 corresponds to a transducer without any modifications, a second configuration ("Configuration B") 1120 corresponds to a transducer with slots 1122, and a third configuration ("Configuration C") 1130 corresponds to a transducer with the slots 1122 covered by mesh 1132 and/or mesh 1134. In addition, the third configuration includes a sealed opening 1136 in which the opening at a center of the transducer is sealed.

In some examples, the slots 1122 are configured to improve a high frequency range of the output audio. For example, a closed structure in front of the audio transducer restricts motion, reducing high frequency output of the device 110. Thus, adding the slots 1122 (e.g., slits or other openings) in the acoustic structure may reduce mass loading and improve the high frequency response. This is illustrated in the output chart 1140, which compares an output level (measured at the ear) of the first configuration 1110 and the third configuration 1130. As a higher output is desirable (shown in decibels or dB), the output chart 1140 illustrates that the third configuration 1130 improves the high frequency output (e.g., above 3 kHz) relative to the first configuration 1110.

While the slots 1120 may improve the high frequency output, these additional openings in the acoustic structure surrounding the transducer may also increase audio leakage. Thus, the third configuration 1130 improves upon the second configuration by adding the mesh 1132/1134 and sealed opening 1136 to dampen the sound waves and/or otherwise reduce the audio leakage. This is illustrated in output/leakage chart 1150, which compares a ratio of the output level (measured at the ear) to the audio leakage (measured behind the driver) between the first configuration 1110 and the third configuration 1130. As a higher number (shown in decibels or dB) indicates lower audio leakage, the output/leakage chart 1150 illustrates that the third configuration 1130 improves the audio leakage in the high frequency output (e.g., above 2.7 kHz) relative to the first configuration 1110.

As described above with regard to FIG. 1B, in addition to allowing the environmental noise to pass through to the user's ear, the open earcup 112 may also allow output audio to leak from the device 110 into the environment (e.g., audio leakage due to the open design). For example, the open earcup 112 may reduce an amount of passive interference associated with the device 110, as there may be fewer layers and/or components configured to block the output audio from traveling in a second direction away from the user's head. To illustrate an example, the device 110 may not include an acoustically reflective housing and/or other dampening materials positioned between the floating audio component 114 and the environment to contain the output audio in all directions.

To reduce an amount of leakage, the device 110 may generate the output audio by performing beamforming using multiple audio transducers 118. The beamforming process directs the output audio in a first direction (e.g., at the user's ear) and reduces a volume of output audio in second direction(s) (e.g., directed away from the user's head). For example, the device 110 may include two audio transducers configured to generate constructive interference in the first direction toward the user's ear and to create destructive interference in the second direction(s) away from the user's ear. This effectively targets the output audio towards the user while reducing a volume of the output audio in the second direction(s).

Figure 12:
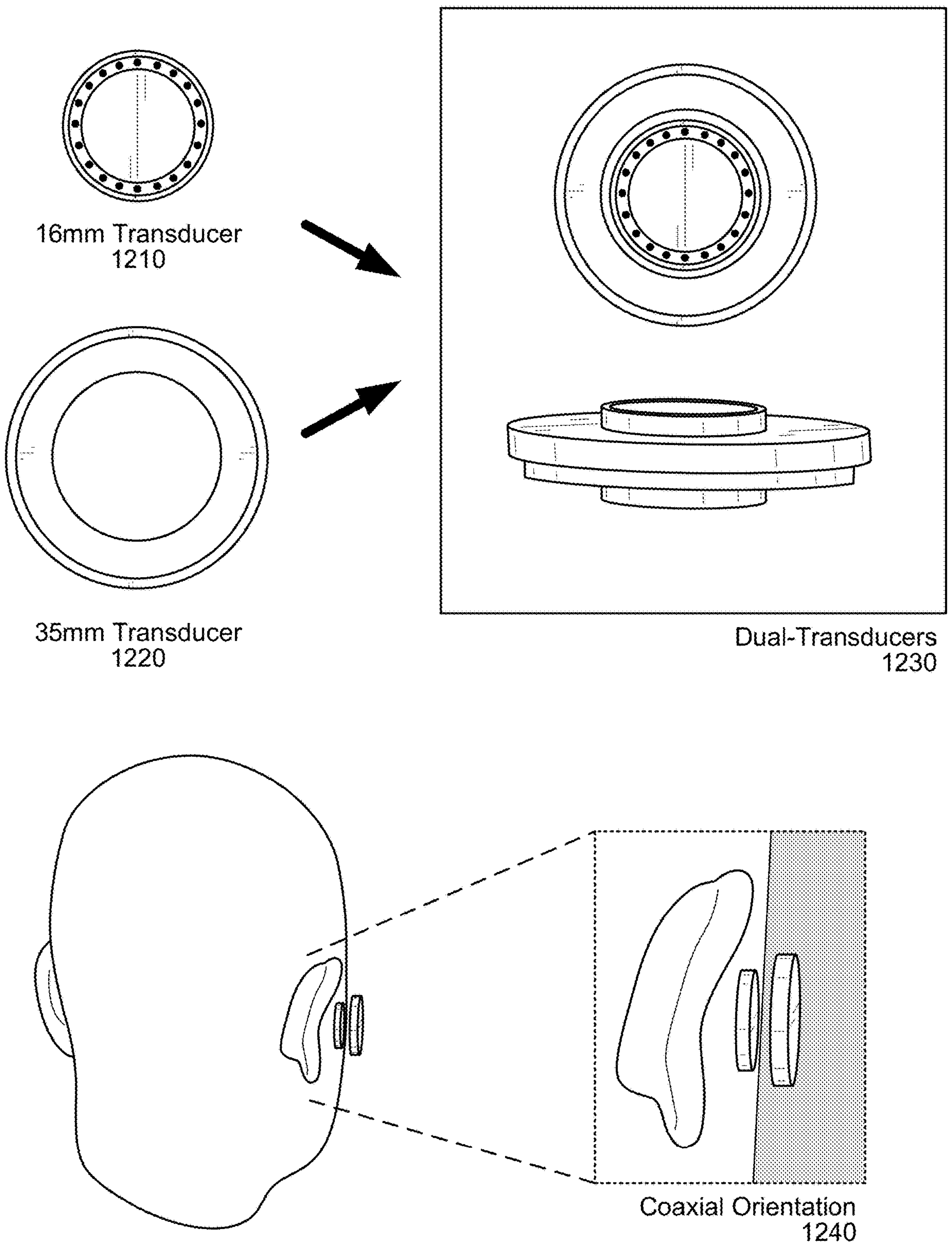
FIG. 12 illustrates an example of a floating audio component including dual-transducers according to embodiments of the present disclosure.

FIG. 12 illustrates an example of a floating audio component including dual-transducers according to embodiments of the present disclosure. As illustrated in FIG. 12, in some examples the device 110 may include two transducers 118 in each earcup 112 (e.g., for each ear). For example, a 16 mm transducer 1210 and a 35 mm transducer 1220 may be combined to generate dual-transducers 1230 that are configured to perform beamforming. Thus, each individual floating audio component 114 may include one set of dual-transducers 1230, such that the device includes two dual-transducers 1230 (e.g., four total transducers 118).

While FIG. 12 illustrates a specific example in which the 16 mm transducer 1210 and the 35 mm transducer 1220 are combined to generate the dual-transducers 1230, this is intended to conceptually illustrate a single example and the disclosure is not limited thereto. Instead, the dual-transducers 1230 may include transducers of varying sizes without departing from the disclosure. For example, the dual-transducers 1230 may include a first transducer and a second transducer having the same size and/or different sizes without departing from the disclosure. Additionally or alternatively, the device 110 may include more than two transducers in a single earcup 112 without departing from the disclosure.

In some examples, the dual-transducers 1230 may have a coaxial orientation 1240, such that the 16 mm transducer 1210 and the 35 mm transducer 1220 are stacked together with a common axis, as illustrated in FIG. 12. However, the disclosure is not limited thereto and the dual-transducers 1230 may have different orientations and/or configurations without departing from the disclosure.

Figure 13:
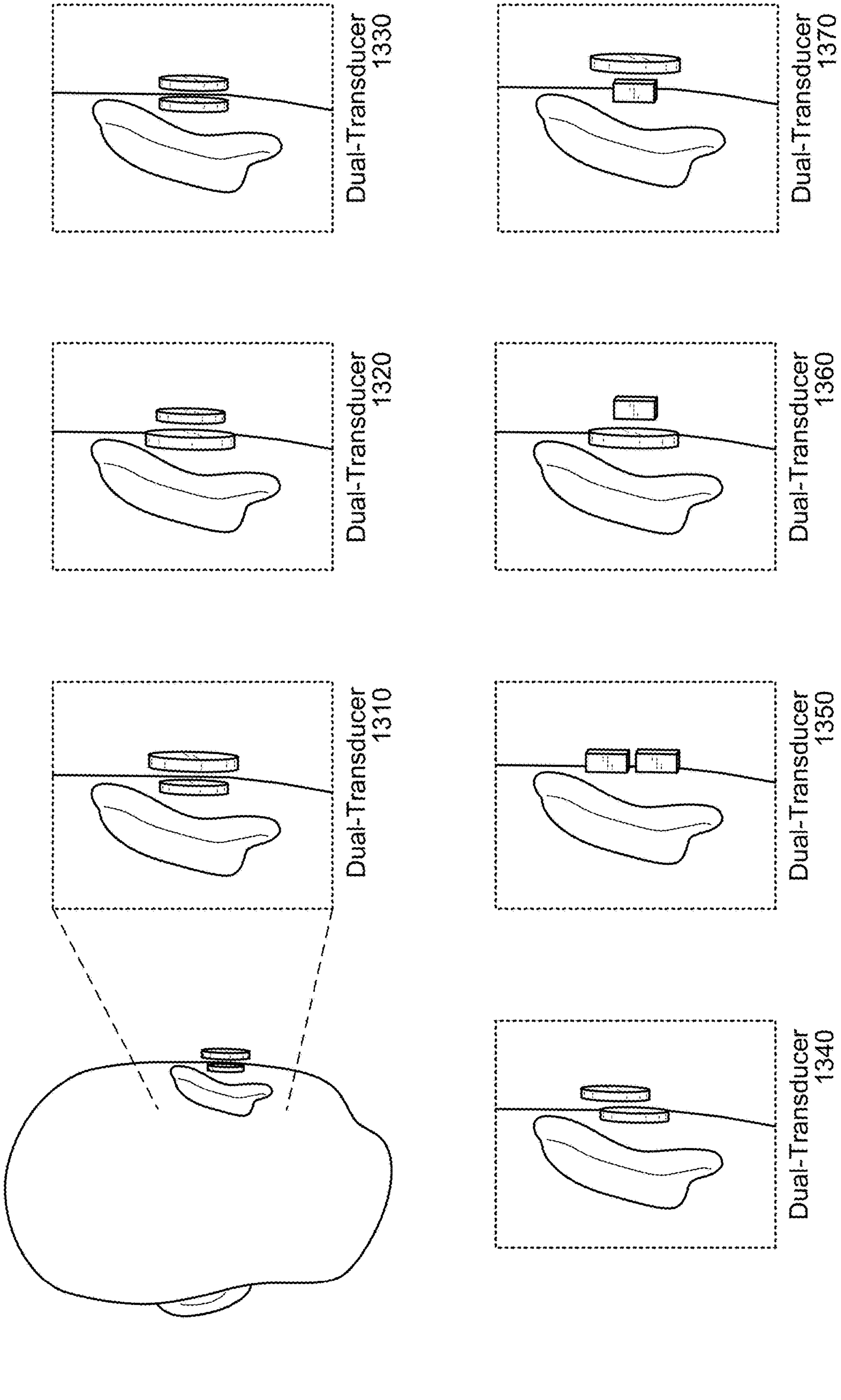
FIG. 13 illustrates examples of dual-transducer configurations according to embodiments of the present disclosure.

FIG. 13 illustrates examples of dual-transducer configurations according to embodiments of the present disclosure. As illustrated in FIG. 13, dual-transducer examples 1300 include transducers of different sizes (e.g., dual-transducers 1310/1320), transducers of equal sizes (e.g., dual-transducers 1330/1340/1350), and different types of transducers (e.g., dual-transducers 1360/1370), although the disclosure is not limited thereto.

For ease of illustration, FIG. 13 illustrates the transducer configurations without any of the other components included in the device 110. Thus, the dual-transducer examples 1300 omit components that are necessary for proper operation of the device 110. Additionally or alternatively, the dual-transducer examples 1300 may illustrate the transducer configurations with exaggerated size differences or spacing to clearly represent how the transducer configurations differ from each other. Thus, the actual positioning and/or spacing of the transducers are not illustrated in FIG. 13 and the transducers are not shown to scale.

As illustrated in FIG. 13, the first dual-transducer 1310 includes a first transducer (e.g., closest to the user) that is smaller than a second transducer (e.g., furthest from the user), and the transducers are stacked in the coaxial orientation 1240 as in the example illustrated in FIG. 12. In contrast, the second dual-transducer 1320 is also stacked in the coaxial orientation 1240, but the second dual-transducer 1320 includes a first transducer that is larger than the second transducer.

The disclosure is not limited thereto, and in some examples the first transducer and the second transducer may be equal in size without departing from the disclosure. For example, the third dual-transducer 1330 is also stacked in the coaxial orientation 1240 but includes a first transducer that is equal in size to the second transducer. In contrast, the fourth dual-transducer 1340 includes a first transducer that is equal in size to the second transducer, but the first transducer is offset from second transducer. Thus, the first transducer is shifted vertically relative to the second transducer (e.g., parallel to the user's ear), such that only a portion of the first transducer overlaps the second transducer.

While the previous examples have illustrated the transducers as circular transducers, the disclosure is not limited thereto and one or more transducers may have a different shape and/or be a different type. For example, the fifth dual-transducer 1350 includes a first transducer that is equal in size to the second transducer, but the first transducer and the second transducer have a different shape that enables them to be situated next to each other (e.g., side by side). Thus, the first transducer is shifted vertically relative to the second transducer (e.g., parallel to the user's ear), such that there is no overlap between the first transducer and the second transducer.

Finally, the sixth dual-transducer 1360 includes a first transducer that is a first type (e.g., circular) and a second transducer that is a second type (e.g., rectangular), with both transducers stacked in the coaxial orientation 1240, while the seventh dual-transducer 1370 includes a first transducer that is the second type (e.g., rectangular) and a second transducer that is the first type (e.g., circular), with both transducers stacked in the coaxial orientation 1240. However, the dual-transducer examples 1300 are only intended to conceptually illustrate some examples and the disclosure is not limited thereto.

In some examples, each of the audio transducers may have an open back (e.g., dipole radiation) with very low sound leakage at low frequencies. Thus, the floating audio component 114 may perform beamforming to increase (e.g., maximize) a first intensity of the output audio in the first direction of the user's ear while reducing (e.g., minimizing) a second intensity of the output audio in the second directions away from the user's ear. In some examples, the device 110 may only perform beamforming for mid-to-high frequency ranges, due to the limited sound leakage at low frequencies. However, the disclosure is not limited thereto and the device 110 may perform beamforming across all frequency ranges without departing from the disclosure.

In some examples, the first transducer 118*a* (e.g., 16 mm transducer 1210) and the second transducer 118*b* (e.g., 35 mm transducer 1220) may use different filter coefficient values to generate output audio having constructive interference in a target zone (e.g., in the first direction toward the user's ear) and destructive interference in a quiet zone (e.g., in the second direction(s) away from the user's ear). For example, the first transducer 118*a* may use a first portion of the filter coefficient values to generate a first portion of the output audio, while the second transducer 118*b* may use a second portion of the filter coefficient values to generate a second portion of the output audio. The device 110 may perform beamforming by varying a phase of the first portion of the output audio relative to the second portion of the output audio, such that the phases match and generate constructive interference (e.g., combine) in the first direction and the phases are opposite and generate destructive interference (e.g., cancel) in the second direction(s).

Figure 14:
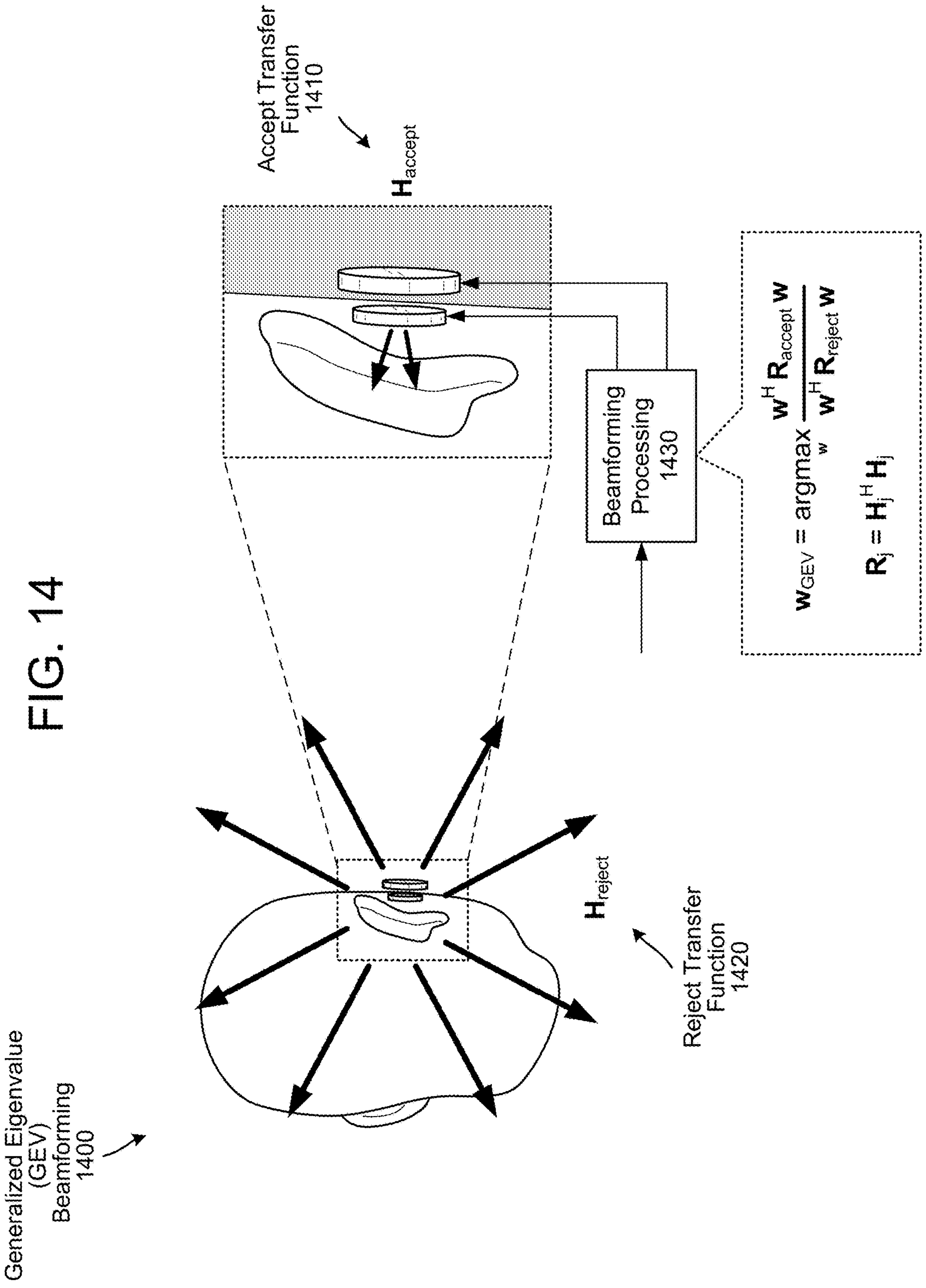
FIG. 14 illustrates an example of beamforming output audio according to embodiments of the present disclosure.

FIG. 14 illustrates an example of beamforming output audio according to embodiments of the present disclosure. As illustrated in FIG. 14, the device 110 may perform generalized eigenvalue (GEV) beamforming 1400 to increase (e.g., maximize) the first intensity of the output audio in the first direction of the user's ear while reducing (e.g., minimizing) the second intensity of the output audio in the second directions away from the user's ear. For example, the GEV beamforming 1400 may target the output audio in the first direction, which is associated with the accept transfer function 1410 (e.g., $H_{accept}$), while trying to reduce the output audio generated in the second directions, which are associated with the reject transfer function 1420 (e.g., $H_{reject}$). Thus, the device 110 may perform beamforming processing 1430 to generate a plurality of filter coefficient values (e.g., $w_{GEV}$) using the following equations:

$$w_{GEV} = \underset{w}{\operatorname{argmax}} \frac{w^H R_{accept} w}{w^H R_{reject} w} \quad [2]$$

$$R_j = H_j^H H_j \quad [3]$$

where $w_{GEV}$ denotes a plurality of filter coefficient values generated using GEV beamforming, $R_{accept}$ can be generated using Equation [3] and the accept transfer function 1410 (e.g., $H_{accept}$), $R_{reject}$ can be generated using Equation [3] and the reject transfer function 1420 (e.g., $H_{reject}$), and the superscript H denotes the Hermitian matrix transpose.

In other words, Equation [2] becomes an Eigen-decomposition problem and the optimal filter coefficient values $w_{GEV}$ can be solved by finding the eigenvector corresponding to a maximum ratio between a first eigenvalue of $H^H_j H_j$ for the accept transfer function 1410 and a second eigenvalue of $H^H_j H_j$ for the reject transfer function 1420. Thus, the filter coefficient values $w_{GEV}$ maximize a ratio between the sound pressure value (e.g., volume level) in the target direction/zone and the sound pressure value in the quiet direction/zone.

To perform beamforming, the device 110 may determine the accept transfer function 1410 (e.g., $H_{accept}$) that is associated with the constructive interference. For example, the device 110 may determine the accept transfer function 1410 associated with the user's ear, which may be represented based on a target direction relative to the dual-transducers 1230 and/or a target zone associated with the user's ear. As used herein, the accept transfer function 1410 (e.g., $H_{accept}$) may correspond to an accepted direction, target direction(s), target zone(s), augmented zone(s), and/or the like without departing from the disclosure.

Similarly, the device 110 may determine the reject transfer function 1420 (e.g., $H_{reject}$) that is associated with the destructive interference. For example, the device 110 may determine the reject transfer function 1420 associated with the environment around the user, which may be represented based on quiet direction(s) relative to the dual-transducers 1230 (e.g., multiple directions extending away from the user's ear) and/or a quiet zone associated with the environment (e.g., locations relative to the device 110 that are not associated with the user's ear). As used herein, the reject transfer function 1420 (e.g., $H_{reject}$) may correspond to rejected direction(s), quiet direction(s), quiet zone(s), cancelling zone(s), and/or the like without departing from the disclosure.

To illustrate an example, the device 110 may determine the accept transfer functions 1410 (e.g., $H_{accept}$) associated with first direction(s) toward the user's ear, may determine the reject transfer functions 1420 (e.g., $H_{reject}$) associated with second direction(s) away from the user's ear, and determine a plurality of filter coefficient values using the accept transfer functions 1410 and the reject transfer functions 1420. For example, the device 110 may solve an optimization problem and/or perform other steps to generate the plurality of filter coefficient values without departing from the disclosure. The device 110 may store the plurality of filter coefficient values and use these filter coefficient values when generating the output audio.

To perform beamforming, the device 110 may receive playback audio data and may retrieve the plurality of filter coefficient values. The device 110 may generate first audio data using a first portion of the plurality of filter coefficient values and the playback audio data and may generate second audio data using a second portion of the plurality of filter coefficient values and the playback audio data. The device 110 may send the first audio data to a first audio transducer 118*a* in a first earcup 112*a* to generate a first portion of output audio and may send the second audio data to a second audio transducer 118*b* in the first earcup 112*a* to generate a second portion of the output audio. Thus, the device 110 may generate output audio with constructive interference in the target zone and destructive interference in the quiet zone, targeting the output audio at the user's ear while reducing a leakage caused by the open earcup 112.

The device 110 may generate output audio using the dual-transducers 1230. In some examples, the device 110 may convert the plurality of filter coefficient values (e.g., $G(\omega)$) into a vector of FIR filters g(k) (e.g., $g_1(k)$ and $g_2(k)$) and may apply the filters g(k) to the playback audio data. For example, the first transducer may be associated with a first filter (e.g., $g_1(k)$) and the second transducer may be associated with a second filter (e.g., $g_2(k)$), which may be optimized FIR filters with a tap-length N, although the disclosure is not limited thereto.

While FIG. 14 illustrates an example of performing GEV beamforming 1400 using a first approach configured to maximize a ratio of the accept transfer function 1410 relative to the reject transfer function 1420, the disclosure is not limited thereto. In some examples, the device 110 may determine the plurality of filter coefficient values using other techniques without departing from the disclosure. For example, the device 110 may determine the plurality of filter coefficient values using a combination of the first approach and a second approach, which maximizes a first sound pressure value (e.g., volume level) in the target direction without regard to a second sound pressure value in the quiet direction.

Thus, the device 110 may determine the plurality of filter coefficient values based on a variety of different factors, such as a user experience (e.g., audio quality), an amount of audio suppression in the quiet sound zone (e.g., a maximum volume level), an amount of ambient noise from surrounding devices, and/or the like. In some examples, the device 110 may determine weighting coefficient values between the first approach and the second approach based on user preferences. For example, a first user may prefer the quiet sound zone to have a lower volume level and the device 110 may increase a ratio of the sound pressure value in the target direction/zone relative to the sound pressure value in the quiet direction/zone. In contrast, a second user may prefer that the target direction/zone be louder, even at the expense of the quiet direction/zone, and the device 110 may increase a sound pressure value in the target direction/zone without regard to the quiet direction/zone.

Figure 15:
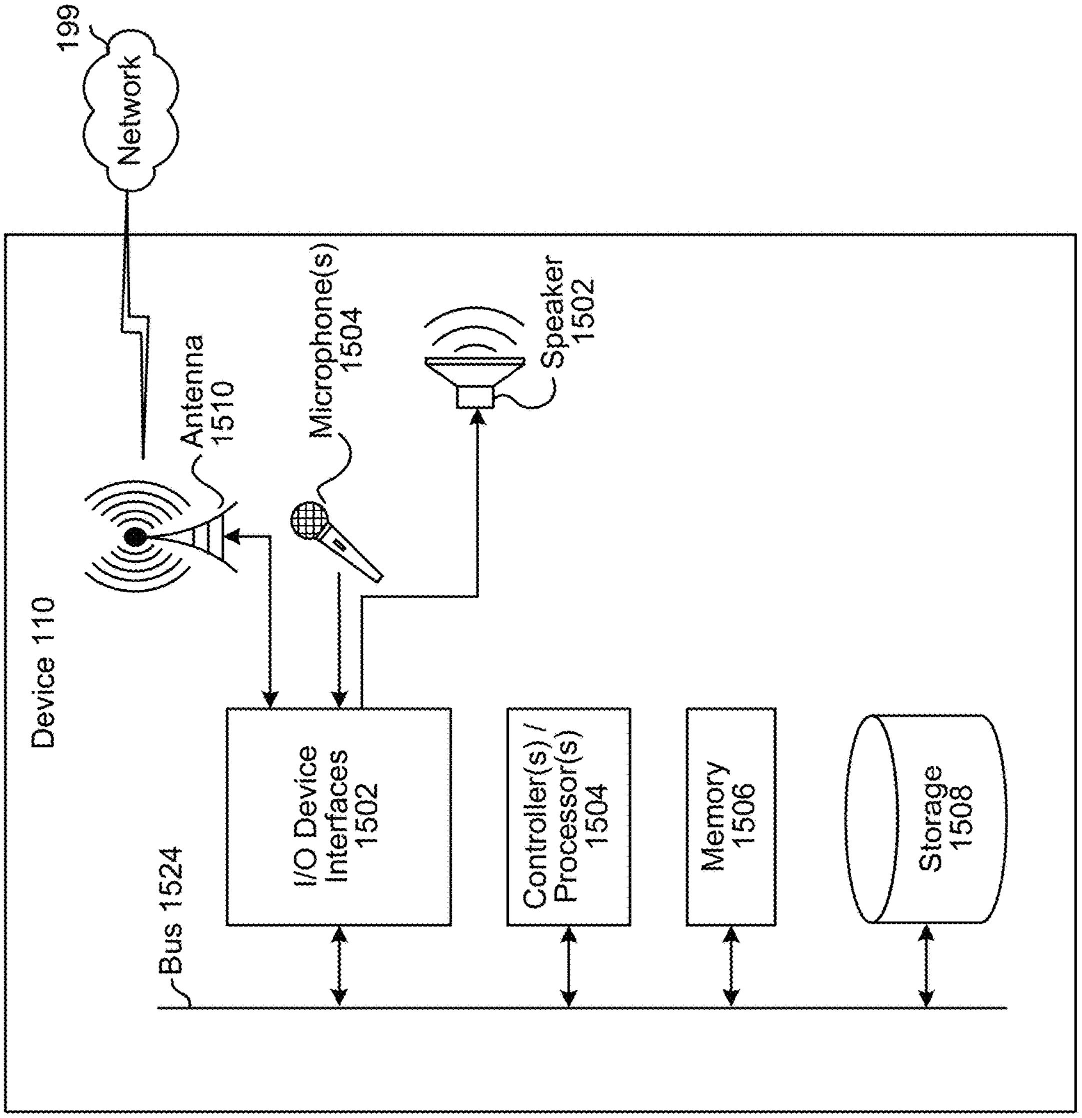
FIG. 15 is a block diagram conceptually illustrating example components of a system for beamforming according to embodiments of the present disclosure.

FIG. 15 is a block diagram conceptually illustrating example components of the system 100. In operation, the system 100 may include computer-readable and computer-executable instructions that reside on the system, as will be discussed further below. The system 100 may include one or more audio capture device(s), such as feedforward microphone(s) 420 and/or feedback microphone(s) 430. The audio capture device(s) may be integrated into a single device or may be separate. The system 100 may also include an audio output device for producing sound, such as speaker(s) 1510 (e.g., audio transducers 118). The audio output device may be integrated into a single device or may be separate. The system 100 may include an address/data bus 1524 for conveying data among components of the system 100. Each component within the system may also be directly connected to other components in addition to (or instead of) being connected to other components across the bus 1524.

The system 100 may include one or more controllers/processors 1504 that may each include a central processing unit (CPU) for processing data and computer-readable instructions, and a memory 1506 for storing data and instructions. The memory 1506 may include volatile random access memory (RAM), non-volatile read only memory (ROM), non-volatile magnetoresistive (MRAM) and/or other types of memory. The system 100 may also include a data storage component 1508, for storing data and controller/processor-executable instructions (e.g., instructions to perform operations discussed herein). The data storage component 1508 may include one or more non-volatile storage types such as magnetic storage, optical storage, solid-state storage, etc. The system 100 may also be connected to removable or external non-volatile memory and/or storage (such as a removable memory card, memory key drive, networked storage, etc.) through the input/output device interfaces 1502.

Computer instructions for operating the system 100 and its various components may be executed by the controller(s)/processor(s) 1504, using the memory 1506 as temporary "working" storage at runtime. The computer instructions may be stored in a non-transitory manner in non-volatile memory 1506, storage 1508, and/or an external device. Alternatively, some or all of the executable instructions may be embedded in hardware or firmware in addition to or instead of software.

The system may include input/output device interfaces 1502. A variety of components may be connected through the input/output device interfaces 1502, such as the speaker(s) 1510, the microphone arrays 102*a*/102*b*, and a media source such as a digital media player (not illustrated). The input/output interfaces 1502 may include A/D converters (not shown) and/or D/A converters (not shown).

The input/output device interfaces 1502 may also include an interface for an external peripheral device connection such as universal serial bus (USB), FireWire, Thunderbolt or other connection protocol. The input/output device interfaces 1502 may also include a connection to one or more networks 199 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network(s) 199, the system 100 may be distributed across a networked environment.

Figure 16:
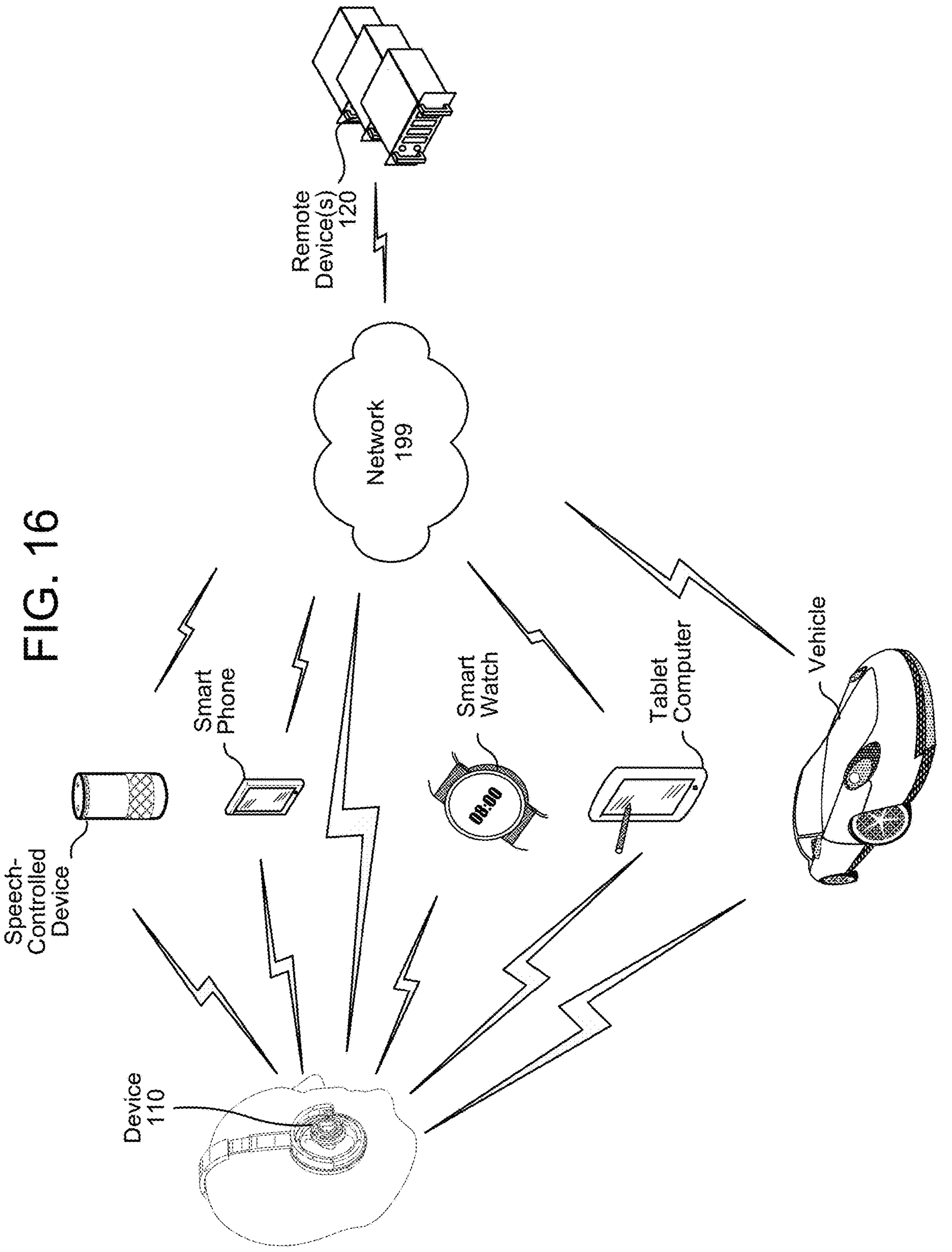
FIG. 16 is a diagram conceptually illustrating example communication between components of a system for beamforming according to embodiments of the present disclosure.

As illustrated in FIG. 16, multiple devices may contain components of the system 100 and the devices may be connected over a network 199. The network 199 may include one or more local-area or private networks and/or a wide-area network, such as the internet. Local devices may be connected to the network 199 through either wired or wireless connections. For example, a speech-controlled device, a tablet computer, a smart phone, a smart watch, and/or a vehicle may be connected to the network 199. One or more remote device(s) 120 may be connected to the network 199 and may communicate with the other devices therethrough. The device 110 may similarly be connected to the remote device(s) 120 either directly or via a network connection to one or more of the local devices. The device 110 may capture audio using one or more microphones or other such audio-capture devices; the device 110 may perform audio processing, voice-activity detection, and/or wakeword detection, and the remote device(s) 120 may perform automatic speech recognition, natural-language processing, or other functions.

The device 110 may process voice commands received from the user, enabling the user to control the devices 110 and/or other devices associated with a user profile corresponding to the user. For example, the device 110 may include a wakeword engine that processes the microphone audio data to detect a representation of a wakeword. When a wakeword is detected in the microphone audio data, the device 110 may generate audio data corresponding to the wakeword and send the audio data to the remote device(s) 120 for speech processing. The remote device(s) 120 may process the audio data, determine the voice command, and perform one or more actions based on the voice command. For example, the remote device(s) 120 may generate a command instructing the device 110 (or any other device) to perform an action, may generate output audio data corresponding to the action, may send the output audio data to the device 110, and/or may send the command to the device 110.

The device 110 may include audio capture component(s), such as microphones of the device 110, which capture audio and create corresponding audio data. Once speech is detected in audio data representing the audio, the device 110 may determine if the speech is directed at the device 110/remote device(s) 120. In at least some embodiments, such determination may be made using a wakeword detection component. The wakeword detection component may be configured to detect various wakewords. In at least some examples, each wakeword may correspond to a name of a different digital assistant. An example wakeword/digital assistant name is "Alexa."

The wakeword detector of the device 110 may process the audio data, representing the audio, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio, is analyzed to determine if specific characteristics of the audio data match preconfigured acoustic waveforms, audio signatures, or other data corresponding to a wakeword.

Thus, the wakeword detection component may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector and/or input is detected by an input detector, the device 110 may "wake" and begin transmitting audio data, representing the audio, to the remote device(s) 120. The audio data may include data corresponding to the wakeword; in other embodiments, the portion of the audio corresponding to the wakeword is removed by the device 110 prior to sending the audio data to the remote device(s) 120. In the case of touch input detection or gesture based input detection, the audio data may not include a wakeword.

In some implementations, the system 100 may include more than one system of remote device(s) 120. The systems may respond to different wakewords and/or perform different categories of tasks. Each system may be associated with its own wakeword such that speaking a certain wakeword results in audio data be sent to and processed by a particular system. For example, detection of the wakeword "Alexa" by the wakeword detector may result in sending audio data to first remote device(s) 120*a* for processing while detection of the wakeword "Computer" by the wakeword detector may result in sending audio data to second remote device(s) 120*b* for processing. The system may have a separate wakeword and system for different skills/systems (e.g., "Dungeon Master" for a game play skill/system) and/or such skills/systems may be coordinated by one or more skill(s) of one or more systems.

Multiple devices may be employed in a single system 100. In such a multi-device system, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system. For example, certain components may be arranged as illustrated or may be arranged in a different manner, or removed entirely and/or joined with other non-illustrated components.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, components of system may be implemented in firmware and/or hardware, such as an acoustic front end (AFE), which comprises, among other things, analog and/or digital filters (e.g., filters configured as firmware to a digital signal processor (DSP)).

Conditional language used herein, such as, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A wearable apparatus comprising:

a first structure configured to contact a head at a first location, wherein the first structure at least partially surrounds a first ear when the wearable apparatus is worn;

a second structure configured to contact the head at a second location, wherein the second structure at least partially surrounds a second ear when the wearable apparatus is worn;

a third structure linking the first structure to the second structure; and a housing coupled to the first structure such that a first edge of the first structure and a second edge of the housing are separated by a first distance, the housing including an audio transducer, at least one microphone, and a component configured to perform active noise cancellation using the at least one microphone, wherein:

the audio transducer is configured to output audio in a first direction towards the first ear, and a portion of the head is visible between the first edge and the second edge.

2. The wearable apparatus of claim 1, wherein the housing further comprises an acoustic structure having a funnel shape and configured to direct the output audio towards the first ear.

3. The wearable apparatus of claim 1, wherein the housing further comprises:

an acoustic structure extending from the audio transducer towards the first ear; and a microphone coupled to the acoustic structure.

4. The wearable apparatus of claim 1, further comprising:

a first acoustic structure having a first funnel shape that extends in the first direction from the audio transducer; and a second acoustic structure having a second funnel shape that extends from the housing in a second direction opposite the first direction.

5. The wearable apparatus of claim 1, wherein:

the first structure is associated with a first plane;

the housing is coupled to the first structure at a first location; and the housing is associated with a second plane, the second plane intersecting the first plane at the first location.

6. The wearable apparatus of claim 1, wherein:

the first structure defines a first oval, the first oval oriented along a first plane parallel to the first ear; and the first structure includes an opening, the opening defining a second oval that is smaller than the first oval, the opening allowing ambient noise to reach the first ear.

7. The wearable apparatus of claim 1, wherein:

the wearable apparatus includes fabric extending from at least the first edge to the second edge; and the fabric allows external audio to reach the first ear.

8. A wearable apparatus comprising:

a first structure configured to contact a head at a first location and at least partially surround a first ear;

a second structure configured to contact the head at a second location and at least partially surround a second ear;

a third structure linking the first structure to the second structure; and a housing coupled to the first structure such that a first edge of the first structure and a second edge of the housing are separated by a first distance, the housing including(i) an audio transducer configured to generate output audio, (ii) an acoustic structure having a funnel shape and configured to direct the output audio towards the first ear, and (iii) a microphone coupled to the acoustic structure, wherein a wide opening of the acoustic structure faces the audio transducer and a narrow opening of the acoustic structure faces the first ear.

9. The wearable apparatus of claim 8, further comprising:

at least one microphone; and a component configured to perform active noise cancellation, wherein a portion of the head is visible between the first edge and the second edge.

10. The wearable apparatus of claim 8, wherein:

the first structure is associated with a first plane;

the housing is coupled to the first structure at a first location; and the housing is associated with a second plane, the second plane intersecting the first plane at the first location.

11. The wearable apparatus of claim 8, wherein:

the first structure defines a first oval, the first oval oriented along a first plane parallel to the first ear; and the first structure includes an opening, the opening defining a second oval that is smaller than the first oval, the opening allowing ambient noise to reach the first ear.

12. The wearable apparatus of claim 8, wherein:

the wearable apparatus includes fabric extending from at least the first edge to the second edge; and the fabric allows external audio to reach the first ear.

13. A wearable apparatus comprising:

a first structure configured to contact a head at a first location and at least partially surround a first ear;

a second structure configured to contact the head at a second location and at least partially surround a second ear;

a third structure linking the first structure to the second structure;

a housing coupled to the first structure such that a first edge of the first structure and a second edge of the housing are separated by a first distance, the housing including(i) an audio transducer configured to generate output audio, (ii) an acoustic structure extending from the audio transducer in a first direction towards the first ear, and (iii) a microphone coupled to the acoustic structure; and fabric extending from at least the first edge to the second edge, wherein the fabric allows external audio to reach the first ear.

14. The wearable apparatus of claim 13, further comprising:

at least one microphone; and a component configured to perform active noise cancellation, wherein a portion of the head is visible between the first edge and the second edge.

15. The wearable apparatus of claim 13, wherein the acoustic structure has a funnel shape and is configured to direct the output audio towards the first ear.

16. The wearable apparatus of claim 13, wherein:

the first structure is associated with a first plane;

the housing is coupled to the first structure at a first location; and the housing is associated with a second plane, the second plane intersecting the first plane at the first location.

17. The wearable apparatus of claim 13, wherein:

the first structure defines a first oval along a first plane parallel to the first ear; and the first structure includes an opening, the opening defining a second oval that is smaller than the first oval, the opening allowing ambient noise to reach the first ear.

* * * * *